United States Patent
Kawaguchi et al.

(10) Patent No.: US 9,639,950 B2
(45) Date of Patent: May 2, 2017

(54) SITE ESTIMATION DEVICE, SITE ESTIMATION METHOD, AND SITE ESTIMATION PROGRAM

(71) Applicant: PANASONIC CORPORATION, Osaka (JP)

(72) Inventors: Kyoko Kawaguchi, Tokyo (JP); Masamoto Tanabiki, Kanagawa (JP); Yuji Sato, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 89 days.

(21) Appl. No.: 14/388,254

(22) PCT Filed: Mar. 15, 2013

(86) PCT No.: PCT/JP2013/001777
§ 371 (c)(1),
(2) Date: Sep. 26, 2014

(87) PCT Pub. No.: WO2013/145615
PCT Pub. Date: Oct. 3, 2013

(65) Prior Publication Data
US 2015/0055875 A1    Feb. 26, 2015

(30) Foreign Application Priority Data

Mar. 29, 2012  (JP) ................. 2012-076072

(51) Int. Cl.
*G06K 9/46* (2006.01)
*G06T 7/00* (2017.01)
*G06K 9/00* (2006.01)

(52) U.S. Cl.
CPC ........ *G06T 7/0085* (2013.01); *G06K 9/00362* (2013.01); *G06K 9/4638* (2013.01);
(Continued)

(58) Field of Classification Search
None
See application file for complete search history.

(56) References Cited

U.S. PATENT DOCUMENTS 9,165,199 B2 * 10/2015  Zhu .................... G06K 9/00201
2004/0091153 A1   5/2004  Nakano et al.
(Continued)

FOREIGN PATENT DOCUMENTS

CN    101882319 A    11/2010
JP    05-143734 A    6/1993
(Continued)

OTHER PUBLICATIONS

International Search Report for Application No. PCT/JP2013/001777 dated May 14, 2013.
(Continued)

*Primary Examiner* — Fred Hu
(74) *Attorney, Agent, or Firm* — Pearne & Gordon LLP

(57) ABSTRACT

With this device, an edge pair likelihood map generation unit (120) computes edge pair likelihood which denotes the plausibility that a pixel of a pair is an edge of an estimation subject site, and generates an edge pair likelihood map which denotes the edge pair likelihood for each pixel. A continuity likelihood map generation unit (130) evaluates, upon the edge pair likelihood map, the continuity for the edge pair likelihood of a pixel which is included in a region wherein the estimate subject site is presumed, and generates a continuity likelihood map which denotes an edge pair likelihood which has continuity as a candidate region of the estimate subject site. An integrated likelihood map generation unit (140) generates an integrated likelihood map which denotes the candidate region which the continuity likelihood map denotes, refined based on a predetermined condition.

8 Claims, 14 Drawing Sheets

(52) U.S. Cl.
CPC .......... *G06T 7/0042* (2013.01); *G06T 7/0083* (2013.01); *G06T 7/0087* (2013.01); *G06T 2207/20076* (2013.01); *G06T 2207/20136* (2013.01); *G06T 2207/30196* (2013.01); *G06T 2207/30232* (2013.01)

(56) References Cited

U.S. PATENT DOCUMENTS

| | | | |
|---|---|---|---|
| 2009/0252423 A1 | 10/2009 | Zhu | |
| 2010/0329560 A1* | 12/2010 | Li | G06K 9/6297 382/173 |
| 2013/0251260 A1* | 9/2013 | Aerts | G06T 7/0081 382/173 |
| 2014/0010409 A1* | 1/2014 | Yamashita | G06K 9/00342 382/103 |

FOREIGN PATENT DOCUMENTS

| | | | | |
|---|---|---|---|---|
| JP | 09-198505 | A | 7/1997 | |
| JP | 2004-206656 | A | 7/2004 | |
| JP | 2005-165923 | A | 6/2005 | |
| JP | 2011-087144 | A | 4/2011 | |
| JP | 4784709 | B1 * | 10/2011 | .......... G06K 9/00342 |

OTHER PUBLICATIONS

Kiyoshi Hashimoto et al., "Shisei Hendo ni Tomonau Shintaiteki Tokucho Henka no Tokeiteki Modeling ni yoru Shahei ni Ganken na Jinbutsu Tsuiseki", Eizo Joho Industrial, Mar. 1, 2012 (Mar. 1, 2012), vol. 44, No. 3, pp. 41 to 50.

Translation of Search Report issued in Chinese Patent Application No. 2013800135873 dated Feb. 29, 2016.

* cited by examiner

X-AXIS DIRECTION → 810

Y-AXIS DIRECTION ↓

| 0 | 0 | 0 | 0 | 1 | 0 | 2 | 0 | 2 |
|---|---|---|---|---|---|---|---|---|
| 0 | 0 | 0 | 0 | 1 | 4 | 0 | 0 | 2 |
| 5 | 0 | 0 | 2 | 7 | 8 | 5 | 3 | 0 |
| 0 | 3 | 0 | 1 | 5 | 8 | 2 | 0 | 0 |
| 1 | 0 | 0 | 0 | 0 | 0 | 0 | 1 | 0 |
| 1 | 0 | 0 | 3 | 0 | 0 | 1 | 1 | 0 |

X-AXIS DIRECTION → 820

Y-AXIS DIRECTION ↓

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 2 | 7 | 8 | 5 | 3 | 0 |
| 0 | 0 | 0 | 1 | 5 | 8 | 2 | 0 | 0 |
| 0 | 0 | 0 | 0 | 0 | 0 | 0 | 0 | 0 |
| 0 | 0 | 0 | 0 | 0 | 0 | 0 | 0 | 0 |

SITE ESTIMATION DEVICE, SITE ESTIMATION METHOD, AND SITE ESTIMATION PROGRAM

TECHNICAL FIELD

The present invention relates to a part estimation apparatus, a part estimation method and a part estimation program for estimating a part of an articulated object such as a person, an animal and a robot.

BACKGROUND ART

There have been active studies on estimation of human posture based on a captured moving picture. A posture estimation apparatus can determine a person's motions from a moving picture through computer analysis and thus can perform behavior analysis without involving manual works. Applications of behavior analysis include detection of unexpected behaviors on the street, analysis of in-store purchase behaviors, aid in work efficiency improvement at a factory, and form coaching in sports, for instance.

For example, PTL 1 discloses a technique of estimating a person's posture based on an image of the person captured using a monocular camera.

In the technique disclosed in PTL 1 (hereinafter, referred to as "related art"), first, candidates for a part are extracted based on an ellipse shape or parallel lines included in a captured image of the person. Then, in the related art, a part likelihood and a part relationship likelihood are calculated using a likelihood function statistically obtained from a plurality of sample images. Further, in the related art, an optimal combination of candidates for the part is calculated based on the calculated likelihood. Therefore, with the related art, it is possible to specify which part is located in which region, so that it is possible to estimate the person's posture regardless of a position or an orientation of the person.

CITATION LIST

Patent Literature

PTL 1
Japanese Patent Application Laid-Open No. 2005-165923

SUMMARY OF INVENTION

Technical Problem

However, the related art has a problem in that a part cannot be estimated with high accuracy depending on image capturing conditions, because while the related art assumes extraction of an outline of a part from the captured image with parallel lines, it is actually difficult to extract only the outline of the part as parallel lines due to wrinkles or shadow of clothes at the part as well as a shape or shadow of an object behind the part.

It is therefore an object of the present invention to estimate a part of an articulated object with high accuracy.

Solution to Problem

A part estimation apparatus according to an aspect of the present invention includes: an edge pair likelihood map generation section that calculates an edge pair likelihood for each pixel in an image and that generates an edge pair likelihood map indicating the edge pair likelihood for each pixel, the edge pair likelihood indicating a likelihood that a pair of pixels existing in a vicinity of each pixel is edges of an estimation target part; a continuity likelihood map generation section that evaluates continuity of edge pair likelihoods of pixels included in a region assumed to represent the estimation target part for the edge pair likelihood map and that generates a continuity likelihood map indicating edge pair likelihoods having continuity as candidate regions indicating the estimation target part; and an integrated likelihood map generation section that generates an integrated likelihood map indicating the candidate regions indicated in the continuity likelihood map by narrowing down the candidate regions based on a predefined condition.

A part estimation method according to an aspect of the present invention includes: calculating an edge pair likelihood for each pixel in an image and generating an edge pair likelihood map indicating the edge pair likelihood for each pixel, the edge pair likelihood indicating a likelihood that a pair of pixels existing in a vicinity of each pixel is edges of an estimation target part; evaluating continuity of edge pair likelihoods of pixels included in a region assumed to represent the estimation target part for the edge pair likelihood map and generating a continuity likelihood map indicating edge pair likelihoods having continuity as candidate regions indicating the estimation target part; and generating an integrated likelihood map indicating the candidate regions indicated in the continuity likelihood map by narrowing down the candidate regions based on a predefined condition.

A part estimation program according to an aspect of the present invention is a program causing a computer of an apparatus that inputs or generates an image to execute processing including: calculating an edge pair likelihood for each pixel in an image and generating an edge pair likelihood map indicating the edge pair likelihood for each pixel, the edge pair likelihood indicating a likelihood that a pair of pixels existing in a vicinity of each pixel is edges of an estimation target part; evaluating continuity of edge pair likelihoods of pixels included in a region assumed to represent the estimation target part for the edge pair likelihood map and generating a continuity likelihood map indicating edge pair likelihoods having continuity as candidate regions indicating the estimation target part; and generating an integrated likelihood map indicating the candidate regions indicated in the continuity likelihood map by narrowing down the candidate regions based on a predefined condition.

Advantageous Effects of Invention

The present invention can estimate a part of an articulated object with high accuracy.

BRIEF DESCRIPTION OF DRAWINGS

FIG. 8 illustrates an example of an edge pair likelihood map in Embodiment 2 of the present invention;

FIG. 9 illustrates an example of a continuity likelihood map in Embodiment 2 of the present invention;

DESCRIPTION OF EMBODIMENTS

Embodiments of the present invention will be described in detail with reference to the accompanying drawings.

(Embodiment 1)

Embodiment 1 of the present invention represents an example of a basic aspect of the present invention.

<Configuration of Part Estimation Apparatus>

Figure 1:
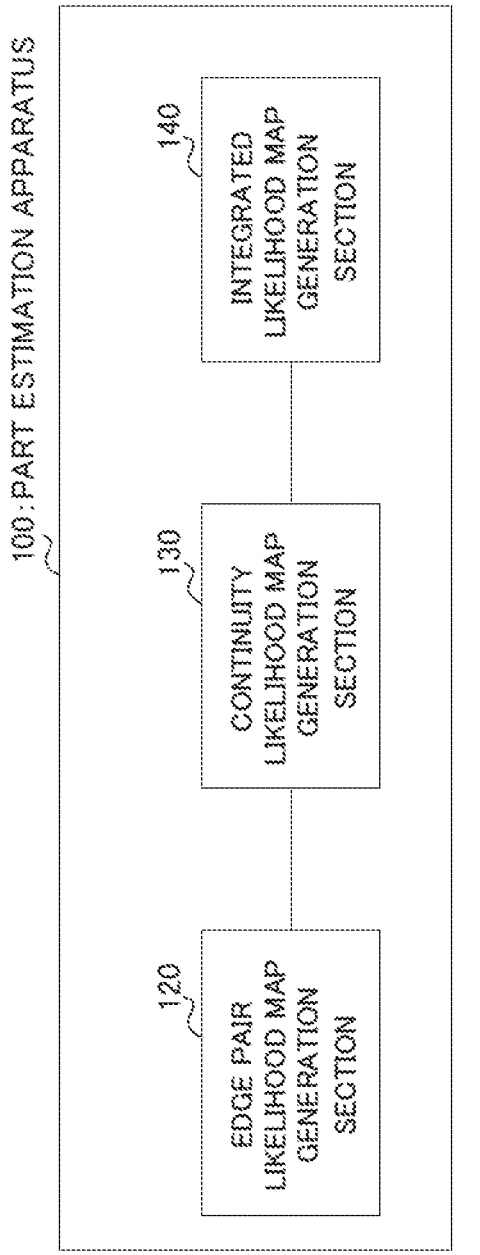
FIG. 1 is a block diagram illustrating an exemplary configuration of a part estimation apparatus according to Embodiment 1 of the present invention.

FIG. 1 is a block diagram illustrating an exemplary configuration of a part estimation apparatus according to the present embodiment.

In FIG. 1, part estimation apparatus 100 includes edge pair likelihood map generation section 120, continuity likelihood map generation section 130 and integrated likelihood map generation section 140.

Edge pair likelihood map generation section 120 calculates an edge pair likelihood for each pixel in an image. The edge pair likelihood for each pixel is a quantified value of a likelihood that a pixel located near the pixel for which the likelihood is calculated is an edge of a part to be estimated (hereinafter, referred to as a "target part"). Edge pair likelihood map generation section 120 calculates the edge pair likelihood based on an edge pair which exists near the pixel and which is parallel to a predetermined gradient direction. Edge pair likelihood map generation section 120 generates an edge pair likelihood map which indicates the calculated edge pair likelihood for each pixel.

Here, the above-described "part" refers to a part of an articulated object of a person. Further, the "person" described here refers to a concept including any articulated object such as a human body, an animal and a robot.

Continuity likelihood map generation section 130 evaluates continuity of the edge pair likelihoods of the pixels included in a region assumed to indicate a size or a shape of the target part, for the edge pair likelihood map. Continuity likelihood map generation section 130 generates a continuity likelihood map which indicates continuous edge pair likelihoods as candidates for a part region. The "part region" described here means a "region occupied by the target part" in the image, that is, a "region indicating the target part."

Integrated likelihood map generation section 140 narrows down the candidates for the part region indicated in the continuity likelihood map based on predefined conditions and generates an integrated likelihood map indicating the narrowed down candidates for the part region.

Part estimation apparatus 100 has, for example, a central processing unit (CPU), a storage medium such as a read-only memory (ROM) having a control program stored therein, and a work memory such as a random access memory (RAM). In this case, functions of the above-described sections are realized by the CPU executing the control program.

Part estimation apparatus 100 configured as described above can estimate a part with high accuracy through the following operation even in a complicated image. It should be noted that the "complicated image" is, for example, an image in which an arm overlaps with a trunk, an image in which there are a large number of edges of parallel lines generated by wrinkles of clothes or artifacts, or the like.

First, edge pair likelihood map generation section 120 calculates an edge pair likelihood for each pixel in the image based on an edge pair which exists near the pixel and which is parallel in a predetermined gradient direction. Edge pair likelihood map generation section 120 generates an edge pair likelihood map indicating the calculated edge pair likelihood for each pixel. Here, a width of the parallel lines is set to correspond to a thickness of the target part, so that edge pair likelihood map generation section 120 can generate an edge pair likelihood map corresponding to the target part.

Continuity likelihood map generation section 130 evaluates the edge pair likelihood map in terms of the target part. The edge pair likelihood for each pixel indicates a likelihood that a pixel located near the pixel for which the likelihood is calculated is an edge of the target part. Accordingly, the sum of the edge pair likelihoods of the pixels included in an assumed region in the image is large in a region where the target part exists. The "assumed region" refers to a region which is assumed in advance to represent a size or a shape of the target part.

If the sum of the edge pair likelihoods within the assumed region is larger than a predefined threshold, continuity likelihood map generation section 130 leaves the edge pair likelihoods within the assumed region in the edge pair likelihood map. Alternatively, if the sum of the edge pair likelihoods within the assumed region is smaller than the predefined threshold, continuity likelihood map generation section 130 may set a value (for example, zero) to indicate that there is no edge pair likelihood within the assumed region.

As described above, part estimation apparatus 100 leaves the edge pair likelihoods of the pixels included in a region which is likely to be the part region instead of filtering the edge pair likelihood for each pixel using a threshold. Accordingly, part estimation apparatus 100 can leave the pixels included in a region which is likely to be the part region even if the edge pair likelihoods are low. Further, part estimation apparatus 100 deletes edge pair likelihoods of pixels included in a region which is not likely to be the part region even if the edge pair likelihoods are high. Accordingly, part estimation apparatus 100 can remove pixels including shadow, wrinkles, or the like, included in a region which is not the part region.

Therefore, part estimation apparatus 100 can estimate a target part with high accuracy compared to the related art even from an image from which it is difficult to extract only an outline of the target part as parallel lines.

(Embodiment 2)

Embodiment 2 of the present invention represents an example of specific aspects as applied to an apparatus which estimates the part of a person included in an image.

<Summary of Part Estimation System>

First, a summary of a part estimation system including the part estimation apparatus according to the present embodiment will be described.

Figure 2:
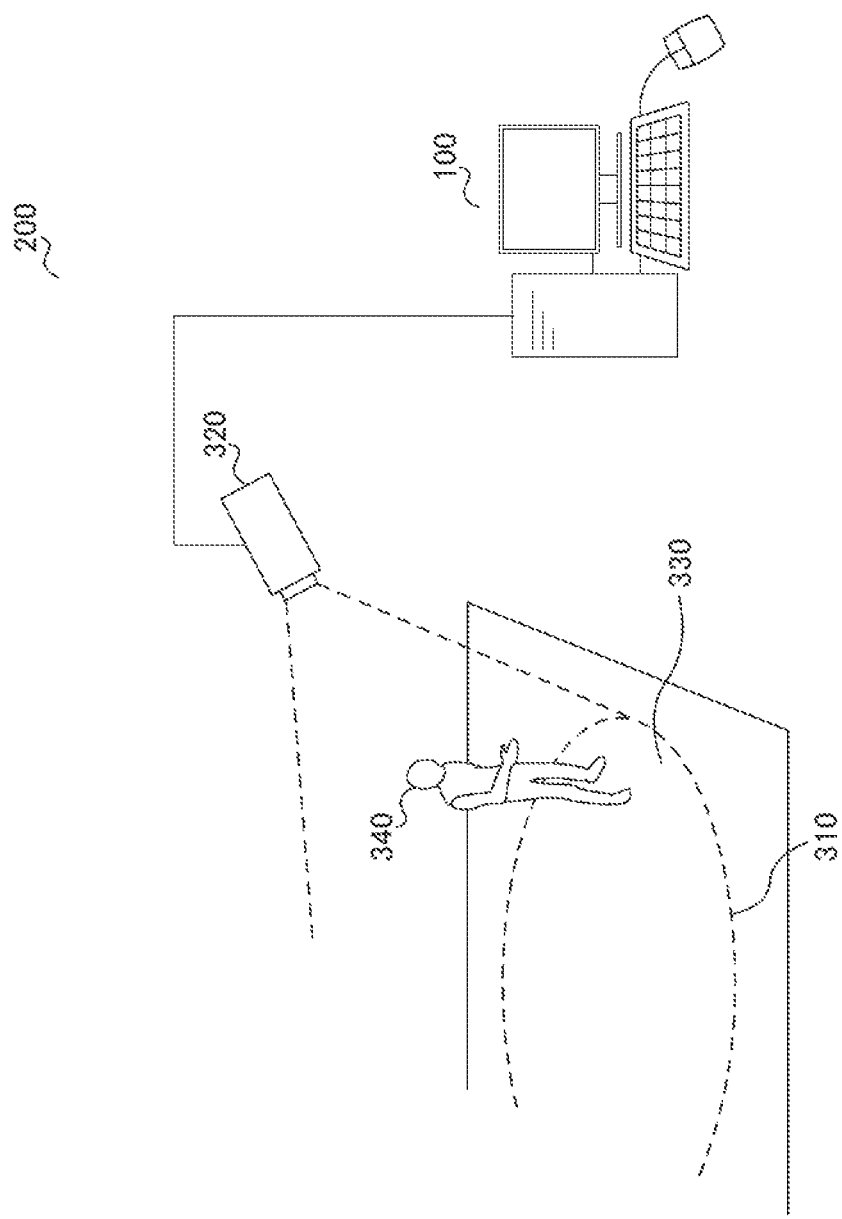
FIG. 2 is a system configuration diagram illustrating an exemplary configuration of a part estimation system according to Embodiment 2 of the present invention.

FIG. 2 is a diagram showing an exemplary configuration of the part estimation system in the present embodiment. In FIG. 2, part estimation system 200 includes monitoring camera 320 for acquiring images of monitored area 310, and part estimation apparatus 100 communicatively connected with monitoring camera 320.

Monitoring camera 320, which may be a digital video camera for example, acquires video pictures of monitored area 310 from above diagonally. That is, images captured by monitoring camera 320 are obtained by capturing images of a real space that includes person 340 and horizontal floor 330. Monitoring camera 320 transmits the captured images to part estimation apparatus 100. It is assumed here that person 340, which is the subject of part estimation, is walking on floor 330 of monitored area 310.

Part estimation apparatus 100, which is, for example, a personal computer, estimates a part of person 340 based on the images received from monitoring camera 320.

The summary of part estimation system 200 has been described above.

<Description Regarding Part of Person>

Next, a part of person 340 which is the subject of estimation in the present embodiment will be described.

Figure 3:
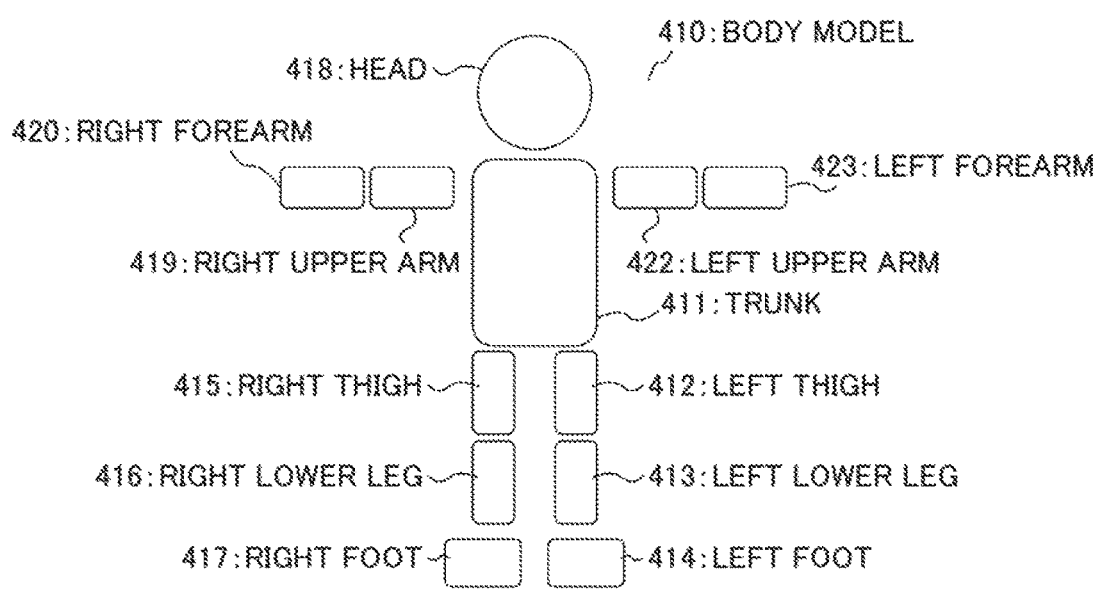
FIG. 3 shows an example of a body model in Embodiment 2 of the present invention.

FIG. 3 illustrates an example of structure model 410 for the body of person 340 (hereinafter referred to as "body model"). Body model 410 is a schematic representation of positional relationships between body parts used in part estimation. Body model 410 includes, for example, trunk 411, left thigh 412, left lower leg 413, left foot 414, right thigh 415, right lower leg 416, right foot 417, head 418, right upper arm 419, right forearm 420, left upper arm 422 and left forearm 423.

These parts are connected by joints, so their ranges of motion are limited by other parts. For instance, left foot 414 can move only within a certain angle range about the point at which left foot 414 is connected with left lower leg 413. It is assumed in the present embodiment that part estimation apparatus 100 estimates a region of each part (the above-described "part region") in body model 410 from an image using a connection relationship between the parts. It should be noted that the body model used by part estimation apparatus 100 is not limited to the example illustrated in FIG. 3.

The part of person 340 which is the subject of estimation has been described above.

<Configuration of Part Estimation Apparatus>

Next, a configuration of part estimation apparatus 100 will be described.

Figure 4:
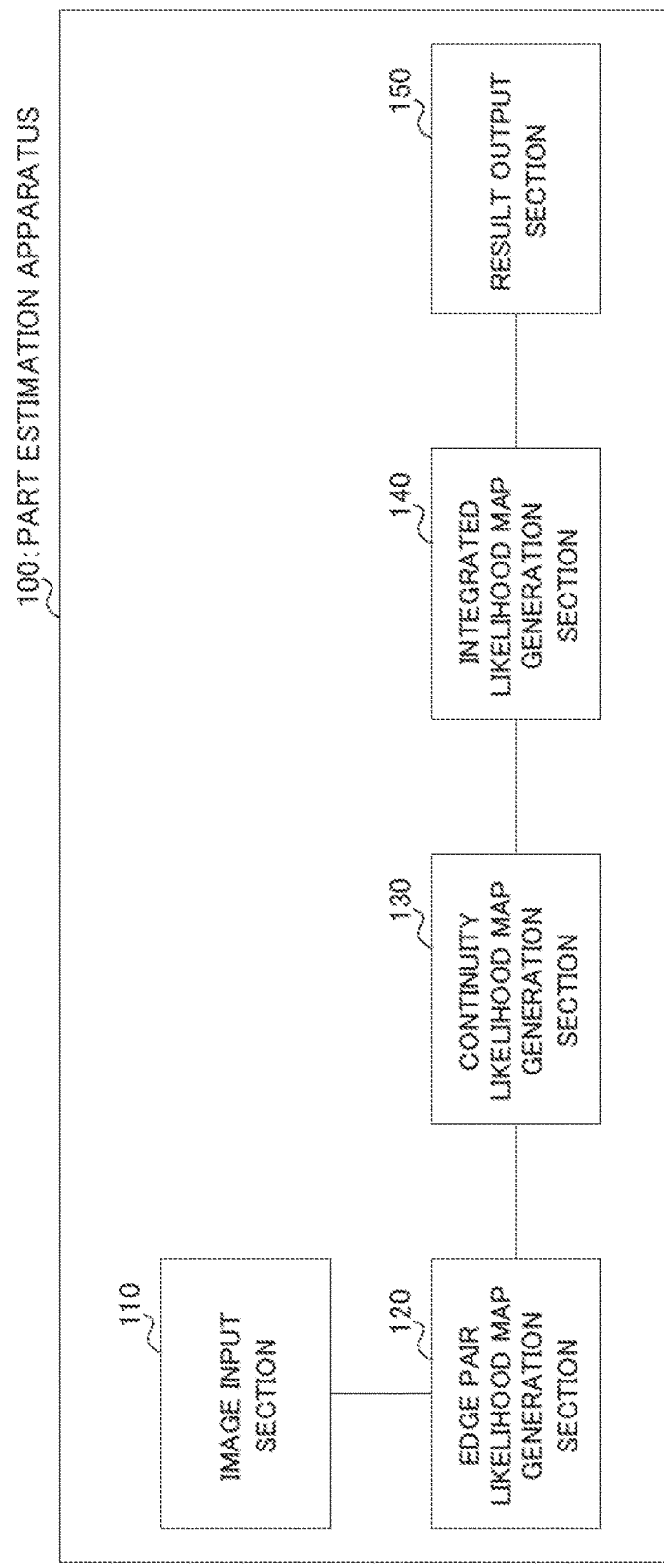
FIG. 4 is a block diagram showing an exemplary configuration of the part estimation apparatus according to Embodiment 2 of the present invention.

FIG. 4 is a block diagram illustrating an exemplary configuration of part estimation apparatus 100. In FIG. 4, part estimation apparatus 100 includes image input section 110, edge pair likelihood map generation section 120, continuity likelihood map generation section 130, integrated likelihood map generation section 140 and result output section 150.

Image input section 110 receives an image.

More specifically, image input section 110 receives image captured by monitoring camera 320. Image input section 110 sequentially outputs the received images to edge pair likelihood map generation section 120.

Edge pair likelihood map generation section 120 detects edges of the images from image input section 110 and detects for each pixel included in the images (hereinafter, referred to as a "pixel of interest"), two pixels (hereinafter, referred to as an "edge pair") based on the pixel of interest. At this time, edge pair likelihood map generation section 120 detects two pixels which are located on a straight line perpendicular to a gradient direction and including the pixel of interest and which are located at an equal distance from the pixel of interest as an edge pair. Edge pair likelihood map generation section 120 specifies regions in predetermined ranges respectively centering around the detected two pixels and calculates an edge pair likelihood of the pixel of interest based on the sum of luminance of pixels within the specified two regions. Edge pair likelihood map generation section 120 generates an edge pair likelihood map indicating the calculated edge pair likelihood for each pixel. The edge pair likelihood for each pixel indicates a quantified value of a likelihood that a pixel located near the pixel for which the likelihood is calculated is an edge of the target part. Edge pair likelihood map generation section 120 generates an edge pair likelihood map for each of a plurality of gradient directions defined in advance.

Here, an edge pair will be described. As described above, two pixels forming the edge pair are located on a straight line perpendicular to a gradient direction defined in advance and including the pixel of interest, and located at an equal distance from the pixel of interest. Further, a distance between the two pixels corresponds to a thickness of the target part. Such two pixels will be referred to as "gradient direction pair pixels." Further, two small regions respectively centering around the gradient direction pair pixels will be referred to as "gradient direction pair vicinity regions."

If both of the gradient direction pair vicinity regions include pixels which are edges (hereinafter, simply referred to as "edges"), it is referred to that an "edge pair exists" for the pixel of interest. At this time, a set of the pixels formed of edges included in the gradient direction pair vicinity regions will be referred to as an "edge pair of the pixel of interest".

Further, an edge pair likelihood of the pixel of interest is calculated based on the edge pair of the pixel of interest. For example, when one of the gradient direction pair vicinity regions includes many edges, while the other of the gradient direction pair vicinity regions includes a few edges, the edge pair likelihood becomes low. A specific method for calculating an edge pair likelihood will be described later.

Further, a map in which the calculated edge pair likelihoods for all the pixels of the image are mapped will be referred to as an "edge pair likelihood map."

Still further, all the edge pair likelihoods included in the edge pair likelihood map are identified by specifying x-coordinate x, y-coordinate y and gradient direction k which indicate a position of the pixel of interest.

It should be noted that in the present embodiment, regions including gradient direction pair regions in all the gradient directions defined in advance for the pixel of interest will be referred to as "local regions."

Edge pair likelihood map generation section 120 generates an edge pair likelihood map for each of the plurality of gradient directions defined in advance. Then, edge pair likelihood map generation section 120 outputs the generated edge pair likelihood map to continuity likelihood map generation section 130.

A method for generating an edge pair likelihood map will be described in detail later.

Continuity likelihood map generation section 130 generates a continuity likelihood map by evaluating continuity of the edge pair likelihoods of the pixels which have the same gradient direction and which are included in the assumed region in the generated edge pair likelihood map.

The edge pair likelihood for each pixel is a likelihood that a pixel located near the pixel for which the likelihood is calculated is an edge of the target part. Therefore, in a region where the target part exists in the image, the sum of the edge pair likelihoods of the pixels included in the assumed region is large.

If the sum of the edge pair likelihoods within the assumed region is large, continuity likelihood map generation section 130 leaves the edge pair likelihoods within the assumed region for each of the edge pair likelihood maps of each gradient direction. Alternatively, if the sum of the edge pair likelihoods within the assumed region is small, continuity likelihood map generation section 130 may set a value (for example, zero) to indicate that there is no edge pair likelihood within the assumed region.

A method for generating a continuity likelihood map will be described in detail later.

Integrated likelihood map generation section 140 extracts a region which satisfies predetermined conditions for the target part among candidates for the part region extracted for each gradient direction from the continuity likelihood map and generates an integrated likelihood map indicating the extracted region.

A method for extracting a region which satisfies the conditions for the target part will be described in detail later.

Result output section 150 outputs a part estimation result by integrated likelihood map generation section 140.

Specifically, result output section 150 includes a display apparatus such as, for example, a liquid crystal display. If the part is estimated, result output section 150 notifies a user of information indicating the part, while, if the part is not estimated, notifies the user of information indicating that the part is not estimated. The notification method includes displaying at least a character or an image.

Part estimation apparatus 100 has, for example, a CPU, a storage medium such as a ROM having a control program stored therein, and a work memory such as a RAM. In this case, functions of the above-described sections are realized by the CPU executing the control program.

The configuration of part estimation apparatus 100 has been described above.

<Description Regarding Operation of Part Estimation Apparatus>

Next, operation of part estimation apparatus 100 will be described.

It is assumed in the present embodiment that image input section 110 outputs an image from which a region estimated to represent person 340 (hereinafter, referred to as a "person candidate region") is extracted from the image input from monitoring camera 320, or the like, to edge pair likelihood map generation section 120.

The above-described "image from which the person candidate region is extracted" refers to an image in which values indicating a background are stored in pixels other than the person candidate region and pixel values of only the pixels of the person candidate region are stored.

The person candidate region may be extracted using a background difference image of the image input from monitoring camera 320, or the like and the background image. A background difference image is an image indicating the difference between a background image captured without person 340 and an input image. Accordingly, part estimation apparatus 100 can deal with pixels which are different from the background in the image input from the monitoring camera, or the like as the person candidate region.

It should be noted that part estimation apparatus 100 may generate the background difference image by, for example, holding the background image in advance and calculating a difference between the background image and the input image. Alternatively, part estimation apparatus 100 may generate the background difference image by extracting a region of a moving object from the input image. The region of the moving object is extracted by, for example, distinguishing a stationary object from the moving object based on a difference between an image which has been previously input and an image input this time. Accordingly, part estimation apparatus 100 can set pixels identified as a part of the moving object as the person candidate region.

It is assumed in the present embodiment that image input section 110 outputs a grayscale image to edge pair likelihood map generation section 120.

If the image input from monitoring camera 320, or the like is a Red Green Blue (RGB) value, image input section 110 converts the image into a grayscale (monochrome) image by extracting only luminance Y (brightness of a pixel) from the RGB value of each pixel and outputs the grayscale image. Luminance Y is calculated using, for example, the following equation:

$$Y(R,G,B) = R \times 0.29891 + G \times 0.58661 + B \times 0.11448$$

Further, it is assumed in the present embodiment that the target part is an arm (right upper arm 419, right forearm 420, left upper arm 422 and left forearm 423). It should be noted that part estimation apparatus 100 may distinguish the forearms from the upper arms in estimating a part.

Further, it is assumed in the present embodiment that an upper region in the image is extracted as an arm candidate region among the person candidate region and sets all the pixels included in the arm candidate region as a target of the process. The upper region is determined in advance as a region, for example, including a predetermined ratio (for example, 10% to 50% from the top) of the person candidate region.

<Description Regarding Operation Using Flowchart of Part Estimation Apparatus>

Figure 5:
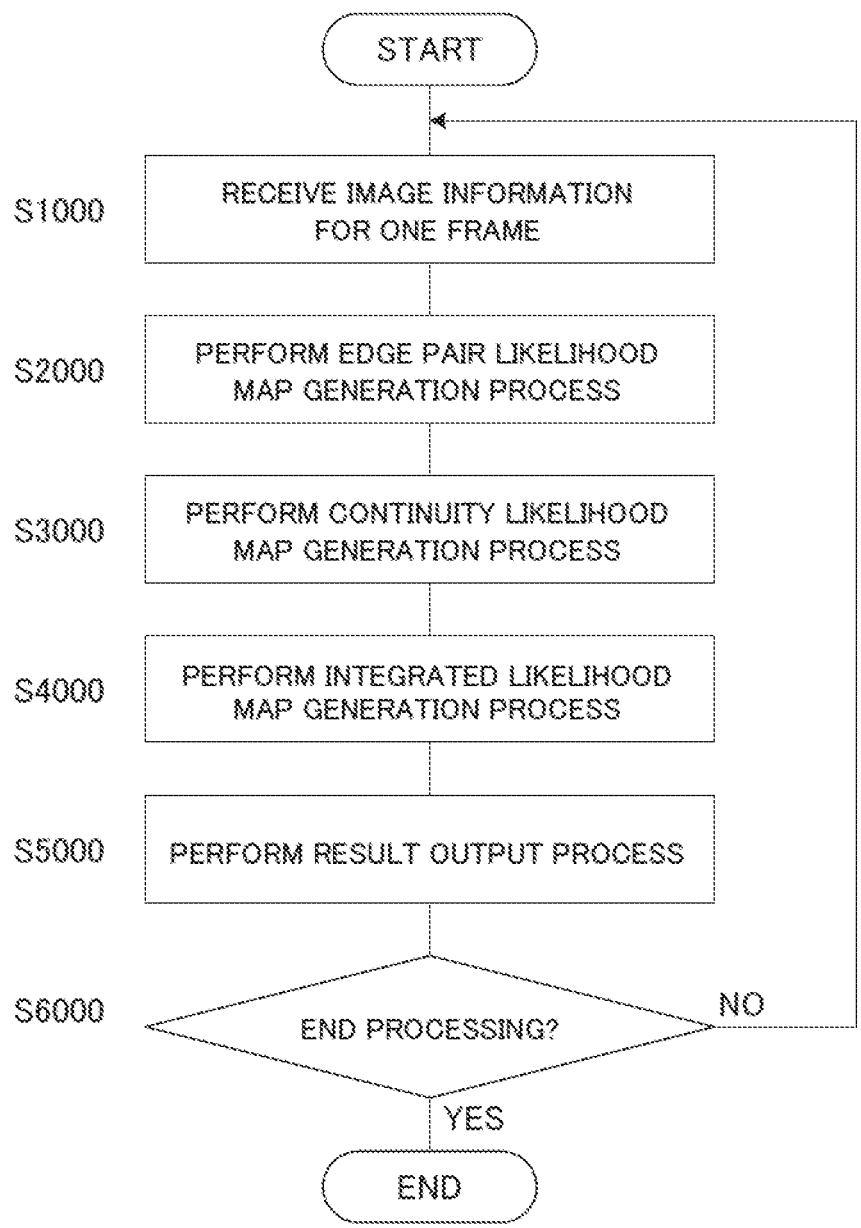
FIG. 5 is a flowchart illustrating an exemplary operation of the part estimation apparatus according to Embodiment 2 of the present invention.

FIG. 5 is a flowchart illustrating exemplary operation of part estimation apparatus 100.

In step S1000, image input section 110 receives input of image data corresponding to one frame.

In step S2000, edge pair likelihood map generation section 120 performs edge pair likelihood map generation process based on the input image. The edge pair likelihood map generation process is a process for generating the above-described edge pair likelihood map. The process will be described in detail later using FIG. 6 and FIG. 7.

In step S3000, continuity likelihood map generation section 130 performs a continuity likelihood map generation process based on the edge pair likelihood map. The continuity likelihood map generation process is a process for generating the above-described continuity likelihood map. The process will be described in detail later using FIG. 8 and FIG. 9.

In step S4000, integrated likelihood map generation section 140 performs integrated likelihood map generation process based on the continuity likelihood map. The integrated likelihood map generation process is a process for generating the above-described integrated likelihood map. The process will be described in detail later using FIG. 10.

In step S5000, result output section 150 performs result output process based on the integrated likelihood map. The result output process is a process for outputting information of a target part estimated in step S4000.

For example, result output section 150 superimposes candidate regions of the estimated part for each image and displays the superimposed regions at a liquid crystal display. It should be noted that result output section 150 may display the regions in a way such as to allow the information indicating gradient directions of the candidate regions of the part to be distinguished by color or the like when the regions are superimposed.

In step S6000, result output section 150 determines whether or not predetermined conditions for terminating the process set in advance are satisfied. The "predetermined conditions for terminating the process" described here, refer to, for example, issuance of an instruction through user operation to terminate part estimation process.

If result output section 150 determines that the predetermined conditions for terminating the process are not satisfied (S6000: No), the flow returns to step S1000 and the process is repeated. Meanwhile, if result output section 150 determines that the predetermined conditions for terminating the process are satisfied (S6000: Yes), a series of process is terminated.

With such operation, part estimation apparatus 100 can generate an integrated likelihood map indicating the most appropriate candidate region extracted from candidate regions of the target part which are extracted based on the edge pair likelihood for each pixel and the continuity likelihood for each assumed region. Accordingly, part estimation apparatus 100 can estimate the target part of person 340 even from an image from which it is difficult to extract an outline of the part with straight lines.

The operation of part estimation apparatus 100 has been described above.

<Description Regarding Edge Pair Likelihood Map Generation Process>

Next, an example of the edge pair likelihood map generation process (step S2000 in FIG. 5) will be described using FIG. 6 and FIG. 7.

Figure 6:
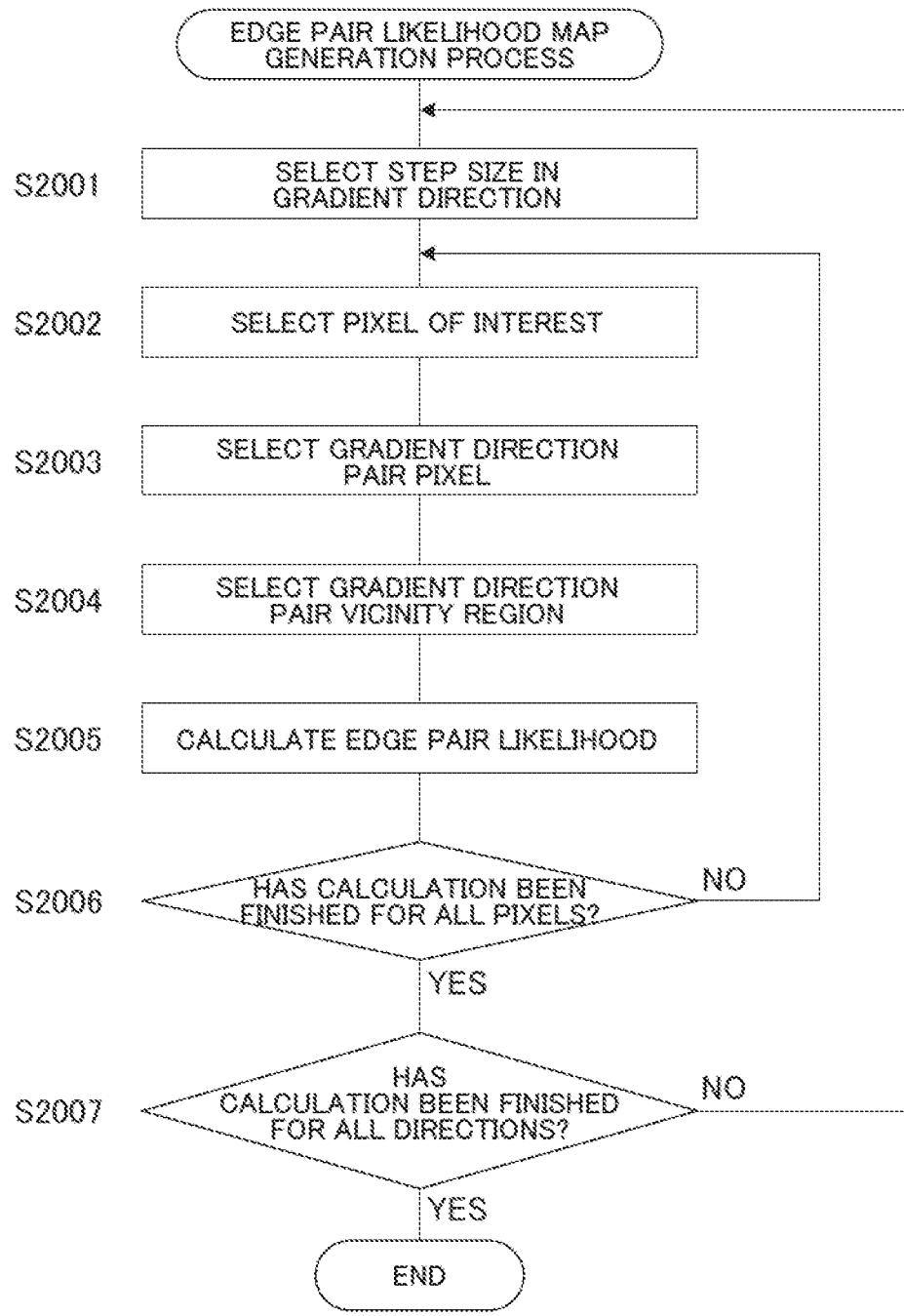
FIG. 6 is a flowchart illustrating an exemplary operation of edge pair likelihood map generation process according to Embodiment 2 of the present invention.

FIG. 6 is a flowchart illustrating exemplary operation of the edge pair likelihood map generation process (step S2000 in FIG. 5). FIG. 7 is a diagram for describing process for generating an edge pair likelihood map whose gradient direction is a horizontal direction. An example of generating the edge pair likelihood map in the horizontal direction will be described here assuming that the horizontal direction is 0 degree.

In step S2001, edge pair likelihood map generation section 120 selects a step size of the edge pair likelihood map to be generated in the gradient direction. It is assumed here that the step size is set at 30 degrees in advance as an example. When the gradient direction is divided by 30 degrees, six edge pair likelihood maps of 0 degree, 30 degrees, 60 degrees, 90 degrees, 120 degrees and 150 degrees are generated. Therefore, in this case, edge pair likelihood map generation section 120 repeats the process from step S2002 to S2007 six times.

The step size of the gradient direction affects estimation accuracy of the target part. If higher estimation accuracy is desired, the user may set a smaller step size. For example, when a case where the step size is set at 45 degrees is compared with a case where the step size is set at 30 degrees, estimation accuracy of the target part is higher in the case where the step size is set at 30 degrees.

In step S2002, edge pair likelihood map generation section 120 selects a pixel of interest from arm candidate region 710. Arm candidate region 710 is an example of the image input from image input section 110. For example, in FIG. 7, edge pair likelihood map generation section 120 selects all the pixels illustrated in FIG. 7 as pixel of interests by incrementing X-coordinate and Y-coordinate by one starting from a pixel at an upper left corner (a pixel indicated with *). The selection method is not limited to this. In FIG. 7, a case where pixel of interest 702 is selected from arm candidate region 710 will be described as an example.

In step S2003, edge pair likelihood map generation section 120 selects gradient direction pair pixels. In FIG. 7, pixels 704 and 705 are selected as the gradient direction pair pixels.

As described above, a case where the edge pair likelihood map in the horizontal direction is generated is described here as an example. Therefore, edge pair likelihood map generation section 120 selects two pixels 704 and 705 which satisfy two conditions as the gradient direction pair pixels. The two conditions are that pixels are located on a straight line which passes through pixel of interest 702 and which is perpendicular to the horizontal straight line, and that a distance from pixel of interest 702 is equal to length 703 which is half of thickness 701 of the target part. That is, when the edge pair likelihood map with angle θ is generated, edge pair likelihood map generation section 120 selects two gradient direction pair pixels. The gradient direction pair pixels are such pixels that are located on a straight line passing through the pixel of interest and perpendicular (θ+90 degrees) to angle θ, and that a distance between the pixels corresponds to length 703 which is half of thickness 701 of the target part. It should be noted that thickness 701 of the target part is a predefined value which represents an average of the thickness of the target part.

In step S2004, edge pair likelihood map generation section 120 selects pixel groups located within a preset distance from the respective gradient direction pair pixels as gradient direction pair vicinity regions. In FIG. 7, the pixel groups located within a distance of vicinity length 708 from gradient direction pair pixels 704 and 705 are respectively selected as gradient direction pair vicinity regions 706 and 707. Vicinity length 708 is a predefined value which represents a length of the appearance error of the part.

Here, the above-described "length of the appearance error" refers to a difference in the thickness of the target part on the image. There is a case where the thickness of the target part differs between at the end and at the center of the part. Further, the captured target part may have different thicknesses on the image or the captured target part may have different thicknesses between the both ends of the part depending on an angle at which the image is captured. Still further, there is also a case where the captured target part may not have a uniform thickness due to wrinkles of clothes, or the like. Therefore, by previously setting a difference in the thickness of the part on a predetermined image with respect to an average thickness of the part as the length of the appearance error of the part, it is possible to realize robust estimation.

In step S2005, edge pair likelihood map generation section 120 calculates an edge pair likelihood of pixel of interest 702. Specifically, edge pair likelihood map generation section 120 calculates a product of a sum of luminance of the pixels within gradient direction pair vicinity region 706 and a sum of luminance of the pixels within gradient direction pair vicinity region 707 as the edge pair likelihood.

It should be noted that edge pair likelihood map generation section 120 may calculate a product of the number of pixels having luminance Y of a predetermined value or higher within gradient direction pair vicinity region 706 and the number of pixels having luminance Y of the predetermined value or higher within gradient direction pair vicinity region 707 as the edge pair likelihood. Accordingly, edge pair likelihood map generation section 120 can normalize the edge pair likelihood with the sizes of gradient direction pair vicinity regions 706 and 707.

In step S2006, edge pair likelihood map generation section 120 determines whether or not calculation of the edge pair likelihood has been finished for all the pixels of arm candidate region 710. If edge pair likelihood map generation section 120 determines that calculation for all the pixels has been finished (S2006: Yes), it is determined that generation of the edge pair likelihood map having the step size selected in step S2001 has been finished, and the flow proceeds to step S2007. Meanwhile, if edge pair likelihood map generation section 120 determines that calculation for all the pixels has not been finished (S2006: No), it is determined that generation of the edge pair likelihood map having the step size selected in step S2001 has not been finished, and the flow proceeds to step S2002.

In step S2007, edge pair likelihood map generation section 120 determines whether or not calculation of the edge pair likelihood has been finished for all the gradient directions. If edge pair likelihood map generation section 120 determines that calculation for all the gradient directions has been finished (S2007: Yes), it is determined that generation of the edge pair likelihood map in all the gradient directions determined in advance has been finished, and a series of processes is terminated. Meanwhile, if edge pair likelihood map generation section 120 determines that calculation has not been finished for all the gradient directions (S2007: No), it is determined that generation of the edge pair likelihood map in all the gradient directions determined in advance has not been finished. Therefore, the flow proceeds to step S2001 so that edge pair likelihood map generation section 120 may generate an edge pair likelihood map in a gradient direction which has not been generated.

Figure 7:
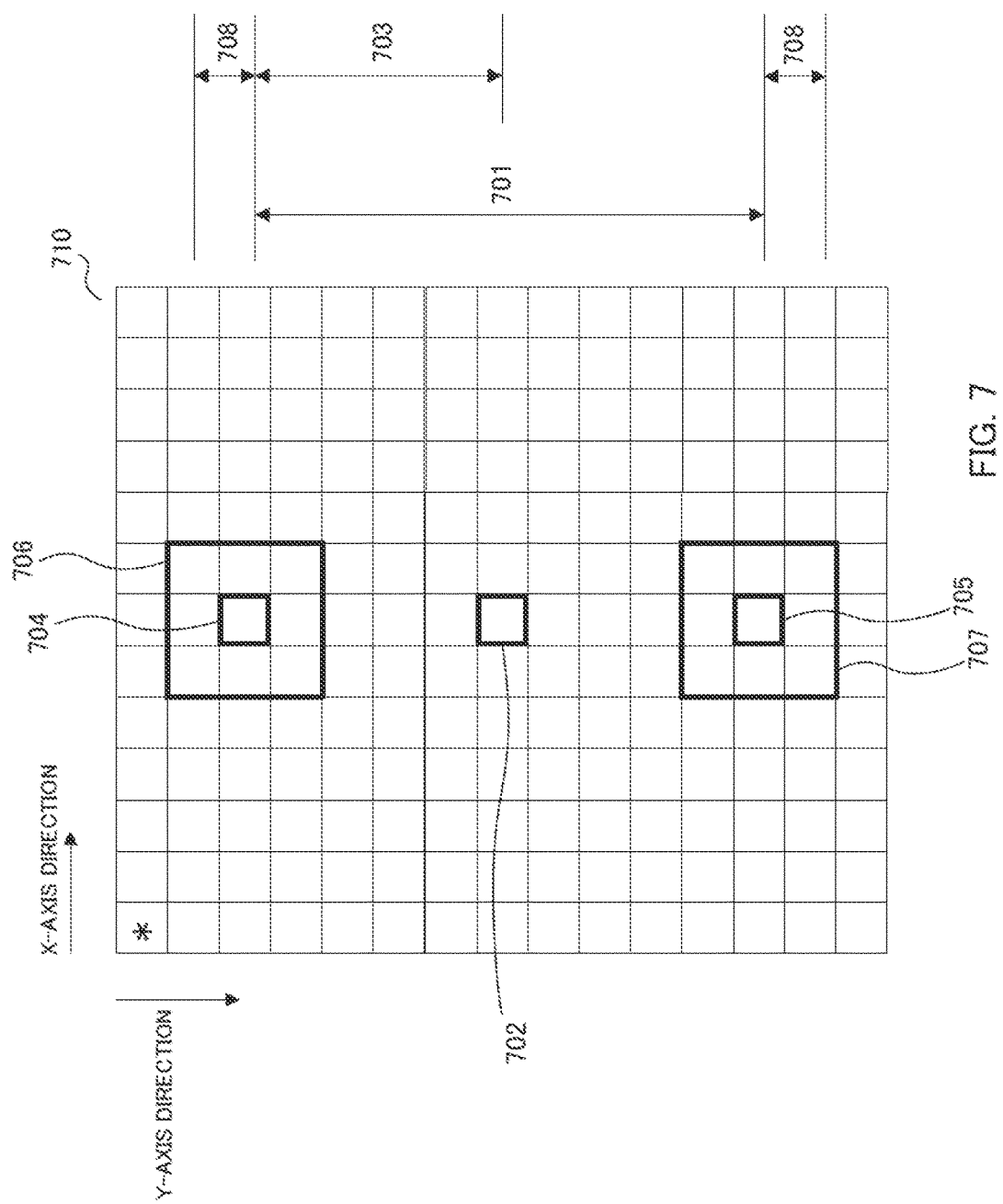
FIG. 7 is a diagram for describing the edge pair likelihood map generation process in Embodiment 2 of the present invention.

While in the above description of FIG. 7, an example has been described where values are set in advance for thickness 701 of the part and vicinity length 708, the present invention is not limited to this. That is, edge pair likelihood map generation section 120 may adjust the values to appropriate values by dynamically changing the values in proportion to the size of the person candidate region or the arm candidate region. Accordingly, edge pair likelihood map generation section 120 can change thickness 701 of the target part and vicinity length 708 to appropriate values according to the size of person 340 on the image. As a result, edge pair likelihood map generation section 120 can generate an edge pair likelihood map with higher accuracy for each gradient direction.

<Description Regarding Continuity Likelihood Map Generation Process>

Next, an example of continuity likelihood map generation process (step S3000 in FIG. 5) will be described using FIG. 8 and FIG. 9.

In the edge pair likelihood map, because a probability that an edge exists in each gradient direction pair vicinity region is higher for pixels within a region where the target part exists than pixels within a region where the target part does not exist, the edge pair likelihood is high for the pixels within the region where the target part exists. Therefore, continuity likelihood map generation section 130 utilizes a fact that it can be judged that if an edge pair likelihood of only a specific pixel within a candidate region for the target part is high and edge pair likelihoods of pixels around the specific pixel are low, the candidate region is not the part region.

FIG. 8 is a diagram illustrating an example of the edge pair likelihood map which becomes a base of the continuity likelihood map. In FIG. 8, an edge pair likelihood in a horizontal direction of each pixel is indicated in region 810 which is a part of the edge pair likelihood map.

Continuity likelihood map generation section 130 uses part rectangle 801 which is a region assumed to represent a size or a shape of the target part in generation of the continuity likelihood map. Part rectangle 801 is an example of the assumed region. FIG. 8 illustrates a rectangle assumed to represent an upper arm or a forearm as part rectangle 801. However, continuity likelihood map generation section 130 can set a part rectangle according to the size or the shape of the target part. Further, while a rectangle is used as an example of part rectangle 801, it is also possible to use an ellipse according to the size or the shape of the target part. Because a connection source and a tip of the part tend to have lower edge pair likelihoods than the center of the part by being influenced by the shape of the connection portion, by shaping the part rectangle in an ellipse shape, it is possible to reduce the influence of the connection source and the tip of the part, so that it is possible to extract a candidate region with higher accuracy.

It is assumed that a short side of part rectangle 801 illustrated in FIG. 8 corresponds to an average thickness of the target part and a long side of part rectangle 801 corresponds to an average length of the target part.

Continuity likelihood map generation section 130 makes a direction of the long side of part rectangle 801 correspond with a gradient direction of the edge pair likelihood map. Continuity likelihood map generation section 130 evaluates a sum of the edge pair likelihoods of the pixels included in part rectangle 801.

Because in FIG. 8, the gradient direction indicates the edge pair likelihood in the horizontal direction, continuity likelihood map generation section 130 sets the direction of the long side of part rectangle 801 to be horizontal. Further, continuity likelihood map generation section 130 sets, for example, an initial position of part rectangle 801 at an upper left corner of the continuity likelihood map. Continuity likelihood map generation section 130 repeats scanning of one pixel in an X-axis direction and movement by one row in a Y-axis direction. Accordingly, continuity likelihood map generation section 130 evaluates a sum of edge pair likelihoods of pixels included in part rectangle 801 for all the regions of the continuity likelihood map.

For example, in FIG. 8, edge pair likelihood P of the edge pair likelihood map is indicated as P(x, y, k) using x-coordinate x, y-coordinate y and gradient direction k which indicate the position of the pixel of interest. Further, the position of the pixel at the upper left corner of part rectangle 801 is indicated as (i, j), a length of the long side of the part rectangle is indicated as "r," the length of the short side is indicated as "s," and the gradient direction is indicated as "k." At this time, continuity likelihood map generation section 130 obtains sum T of the edge pair likelihoods of the pixels enclosed by part rectangle 801 using the following equation:

[1] (Equation 1)

$$T = \sum_{y=j}^{j+s} \sum_{x=i}^{i+r} P(x, y, k)$$

In the example of FIG. 8, (i, j)=(4, 3), r=5 and s=2. Therefore, as a result of calculation with the above equation, sum T of the edge pair likelihoods of the pixels within part rectangle 801 is 41.

If the sum of the edge pair likelihoods is equal to or greater than a predetermined threshold, continuity likelihood map generation section 130 adds coordinate information of the pixels included in part rectangle 801 on the edge pair likelihood map to list information of the evaluation result of the sum and holds the coordinate information. After evaluation of the sum of the edge pair likelihoods of the pixels included in part rectangle 801 has been finished for all the regions of arm candidate region 710, continuity likelihood map generation section 130 performs the following operation. That is, continuity likelihood map generation section 130 holds only the edge pair likelihoods of the pixels for which coordinate information is held in the above-described list information, or continuity likelihood map generation section 130 may set a value (for example, zero) to indicate that there is no edge pair likelihood for the edge pair likelihoods of the remaining pixels. The likelihood after the edge pair likelihood has been evaluated as described above will be referred to as a "continuity likelihood."

FIG. 9 is a diagram illustrating an example of the continuity likelihood map generated based on the edge pair likelihood map illustrated in FIG. 8.

In FIG. 8, it is assumed that if a predetermined threshold is 40, evaluation of the sum of the edge pair likelihoods of the pixels included in part rectangle 801 has been finished for all the regions of part 810 of the arm candidate region. At this time, the pixels held in the list information of the evaluation result of the sum of the edge pair likelihoods are only the pixels in a region enclosed by part rectangle 801 in FIG. 8. Continuity likelihood map generation section 130 generates a continuity likelihood map by setting a value (for example, zero) to indicate that there is no edge pair likelihood for the edge pair likelihoods of the pixels other than the region enclosed by part rectangle 801. As a result, as illustrated in FIG. 9, continuity likelihood map 820 is generated.

Here, the predetermined threshold may be different according to part rectangle 801 of the target part. The predetermined threshold may be changed in proportion to, for example, the size of part rectangle 801 of the target part. Further, the predetermined threshold may be changed according to the position of the target part in the body model. For example, if the target part is located at a tip of the body model, because the target part does not overlap with the other parts and is likely to be detected, a higher threshold is set. Meanwhile, if the target part is located at the center of the body model, because the target part is highly likely to overlap with the other parts and is not likely to be detected, a lower threshold is set. Continuity likelihood map generation section 130 may be configured to set the threshold as described above so as to generate a robust continuity likelihood map. Further, continuity likelihood map generation section 130 may be configured to learn the sum of the edge pair likelihoods of the pixels included in part rectangle 801 of the target part using the edge pair likelihoods of the image prepared in advance.

Continuity likelihood map generation section 130 repeats the above-described process for all the edge pair likelihood maps of each gradient direction. Accordingly, continuity likelihood map generation section 130 can generate a continuity likelihood map of each gradient direction.

As described above, continuity likelihood map generation section 130 sets a threshold for each region assumed to represent the size or the shape of the target part and filters the edge pair likelihoods instead of filtering the edge pair likelihoods of each pixel using the threshold. Continuity likelihood map generation section 130 sets a threshold in units of part rectangle 801 for the region assumed to represent the size or the shape of the target part, for example. Accordingly, continuity likelihood map generation section 130 can leave the pixels which are likely to be included in the part region even if the pixels have lower edge pair likelihoods on a per pixel basis. Further, continuity likelihood map generation section 130 can remove the edge pair likelihoods of the pixels which do not satisfy conditions for the region of the target part as noise. A case where the conditions for the region of the target part are not satisfied includes, for example, a case where even if the edge pair likelihood is high on a per pixel basis, the sum of the edge pair likelihoods in the region assumed to represent the size or the shape of the target part is smaller than the threshold.

<Description Regarding Integrated Likelihood Map Generation Process>

Next, an example of an integrated likelihood map generation process (step S4000 in FIG. 5) will be described using FIG. 10.

Figure 10:
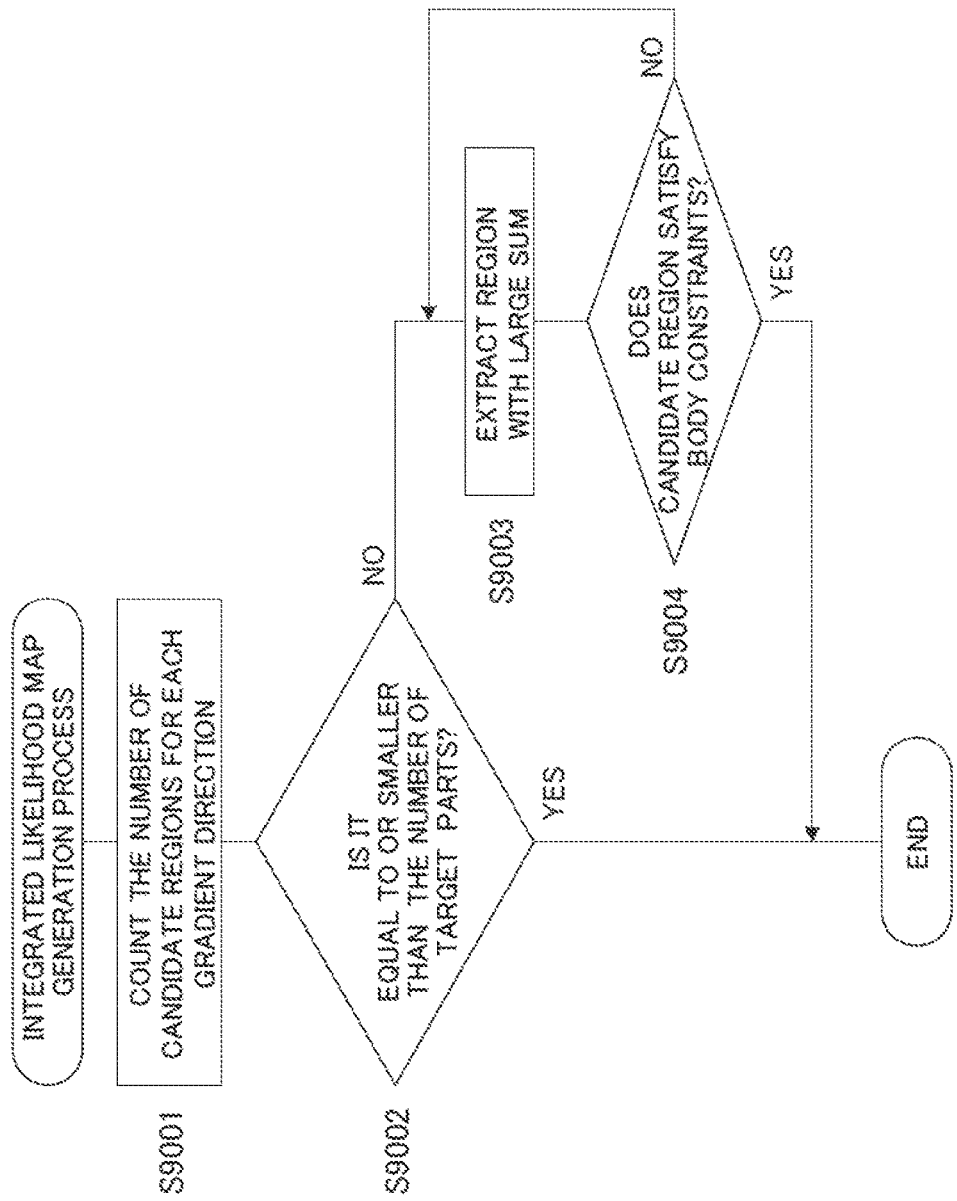
FIG. 10 is a flowchart illustrating an exemplary operation of integrated likelihood map generation process in Embodiment 2 of the present invention.

FIG. 10 is a flowchart illustrating exemplary operation of the integrated likelihood map generation process (step S4000 in FIG. 5).

The integrated likelihood map is created using all the continuity likelihood maps generated for each gradient direction and indicates a region which is the most likely to be the target part.

In step S9001, integrated likelihood map generation section 140 counts the number of candidate regions of the target part for each of the same gradient directions of the continuity likelihood map. That is, if there are six gradient directions, integrated likelihood map generation section 140 counts the number of candidates region for each of the six gradient directions. The "candidate regions for the target part" described here refers to regions where continuity likelihoods are assigned to the pixels which are continuous in the same gradient direction in the continuity likelihood map. For example, in the example of FIG. 9, the number of the candidate regions for the target part is one. It is assumed in the present embodiment that, when the number of candidate regions is counted for each of the six gradient directions, five candidate regions are extracted.

In step S9002, integrated likelihood map generation section 140 compares the sum of the number of candidate regions of the target part counted for each gradient direction with the number of target parts. The "number of target parts" described here is a predefined value. As a result of the comparison, if the sum of the number of candidate regions is equal to or smaller than the number of target parts (S9002: Yes), integrated likelihood map generation section 140 sets the continuity likelihood map as the integrated likelihood map, and a series of process is terminated. Meanwhile, if the sum of the number of candidate regions is larger than the number of target parts (S9002: No), integrated likelihood map generation section 140 proceeds to step S9003.

It is assumed in the present embodiment that the number of target parts is 4 (right forearm 420, right upper arm 419, left upper arm 422 and left forearm 423). Therefore, if the sum of the number of candidate regions is 4 or smaller, integrated likelihood map generation section 140 terminates a series of process, and if the number of the sum of the candidate regions is larger than 4, integrated likelihood map generation section 140 proceeds to step S9003.

In step S9003, integrated likelihood map generation section 140 calculates the sum of the continuity likelihoods of the pixels included in the candidate regions for each of the candidate regions of the target part counted for each gradient direction. Integrated likelihood map generation section 140 extracts the candidate regions corresponding to the number of target parts in a descending order of the calculated sum.

In the present embodiment, because the number of target parts is 4, integrated likelihood map generation section 140 calculates the sum of the continuity likelihoods of the pixels included in the candidate regions for all the 5 candidate regions. Integrated likelihood map generation section 140 then extracts 4 candidate regions in a descending order of the value of the calculated sum.

In step S9004, integrated likelihood map generation section 140 determines whether or not the extracted candidate regions satisfy body constraints of the target part.

For example, it is assumed in the present embodiment that the target part is an upper arm or a forearm, and there are body constraints that the upper arm is connected to the forearm via at least a joint. Specifically, a criterion for determination is used that a tip of one candidate region should exist in the vicinity of at least another tip of each candidate region.

Here, an example of a method for specifying a tip coordinate which indicates the position of the tip of the candidate region will be described.

For example, in the continuity likelihood map illustrated in FIG. 9, in which the gradient direction is a horizontal direction, a group of straight lines in a horizontal direction (an X-axis direction) which pass through the candidate regions is studied. Among these straight lines, a straight line having the longest length where the straight line overlaps with the candidate region is studied. Pixels at boundaries of the straight line and the candidate region are set as pixels at a tip of the candidate region. For example, in FIG. 9, the pixels at the tip of the candidate region can be expressed with values of the x-axis and the y-axis (x, y) of (4, 3) and (8, 3) or (4, 4) and (8, 4). Here, if there are a plurality of pixels at the tip of the candidate region, an average value in each coordinate is set as the tip coordinate, and therefore the tip coordinates become (4, 3.5) and (8, 3.5).

In the present embodiment, integrated likelihood map generation section 140 obtains tip coordinates of other three candidate regions in a similar manner. Integrated likelihood map generation section 140 determines whether within a predetermined distance from either one tip of the part region, a tip of another candidate region exists for each of the candidate regions. If, among all candidate regions, the tip of another candidate region exists within a predetermined distance from either one tip of the part region, integrated likelihood map generation section 140 determines that the body constraints are satisfied. Here, the above-described "predetermined distance" depends on the size of the part region and is a length shorter than the short side of the part region.

If the body constraints are satisfied (S9004: Yes), integrated likelihood map generation section 140 generates an integrated likelihood map by holding the continuity likelihoods of the extracted candidate regions while setting a value (for example, zero) to indicate that there is no continuity likelihood to the other values, and terminates a series of process. Meanwhile, if the body constraints are not satisfied (S9004: No), integrated likelihood map generation section 140 returns to step S9003 and continues to extract the candidate regions.

It should be noted that if all the combinations of the candidate regions do not satisfy the body constraints, integrated likelihood map generation section 140 regards a combination of the candidate regions which are the closest to the body constraints as the candidate regions and extracts the candidate regions. Integrated likelihood map generation section 140 generates an integrated likelihood map by holding the continuity likelihoods of the extracted candidate regions while setting a value (for example, zero) to indicate that there are no continuity likelihoods to other values, and terminates a series of processes.

An example of a method in which integrated likelihood map generation section 140 determines whether or not a predetermined candidate region is the closest to the body constraints will be described. First, integrated likelihood map generation section 140 calculates a shortest distance from either one tip of the part region to the tip of another candidate region of candidate parts where the tip of another candidate region does not exist within a predetermined distance from either one tip of the part region. Integrated likelihood map generation section 140 calculates a sum of differences between the shortest distance and the predetermined distance for each combination of the candidate regions. Integrated likelihood map generation section 140 determines that the candidate region with a small value of the sum is close to the body constraints.

As described above, part estimation apparatus 100 extracts only a region which is the most likely to be a part by utilizing the continuity likelihood map generated for each gradient direction and taking into account the body constraints, so that part estimation apparatus 100 can estimate a part with higher accuracy.

While integrated likelihood map generation section 140 uses the body constraints that "the forearm is connected to the upper arm via a joint," it is also possible to perform process for estimating a position of the head or the shoulder separately and use body constraints that "a tip of the candidate region for the upper arm should exist in the vicinity of the shoulder." Accordingly, part estimation apparatus 100 can estimate a part with higher accuracy.

Further, in the present embodiment, in the flow illustrated in FIG. 9, it is also possible to omit determination (step S9004) itself as to whether or not the body constraints are satisfied.

As described above, with the present embodiment, it is possible to provide the following action and effect. That is, part estimation apparatus 100 generates for each gradient direction, an edge pair likelihood map in which a likelihood of the target part in a local region is quantified for each pixel of the input image. Accordingly, part estimation apparatus 100 can extract all the likelihoods of the target part in the local region. Further, part estimation apparatus 100 generates for each gradient direction, a continuity likelihood map indicating a likelihood of the target part determined based on a region corresponding to the target part on the edge pair likelihood map. Accordingly, part estimation apparatus 100 can determine that a region which does not satisfy the likelihood of the part as a region is not the part even if the region satisfies the likelihood of the part as the local region.

Further, part estimation apparatus 100 generates an integrated likelihood map that indicates regions which satisfy the body constraints for the most likely target part by narrowing down the candidate regions among those extracted for each gradient direction from the continuity likelihood map. Accordingly, part estimation apparatus 100 can estimate the target part of person 340.

Through the above-described series of operations, part estimation apparatus 100 can estimate a part of person 340 with high accuracy even from an image from which it is difficult to extract an outline of the part with straight lines as described above.

(Embodiment 3)

Embodiment 3 of the present invention is an example of a specific aspect in a case where the present invention is applied to an apparatus which estimates a part of a person included in the captured image.

The present embodiment includes functions further added to Embodiment 2, and the same portions as those in Embodiment 2 are denoted with the same reference numerals and descriptions thereof are omitted.

In the present embodiment, if an artifact having a shape similar to that of a target part exists in an image, a part estimation apparatus can estimate a part with higher accuracy by distinguishing the target part from the artifact.

A summary of a part estimation system including the part estimation apparatus according to the present embodiment is the same as that of Embodiment 2.

<Configuration of Part Estimation Apparatus>

A configuration of part estimation apparatus 100b will be described.

Figure 11:
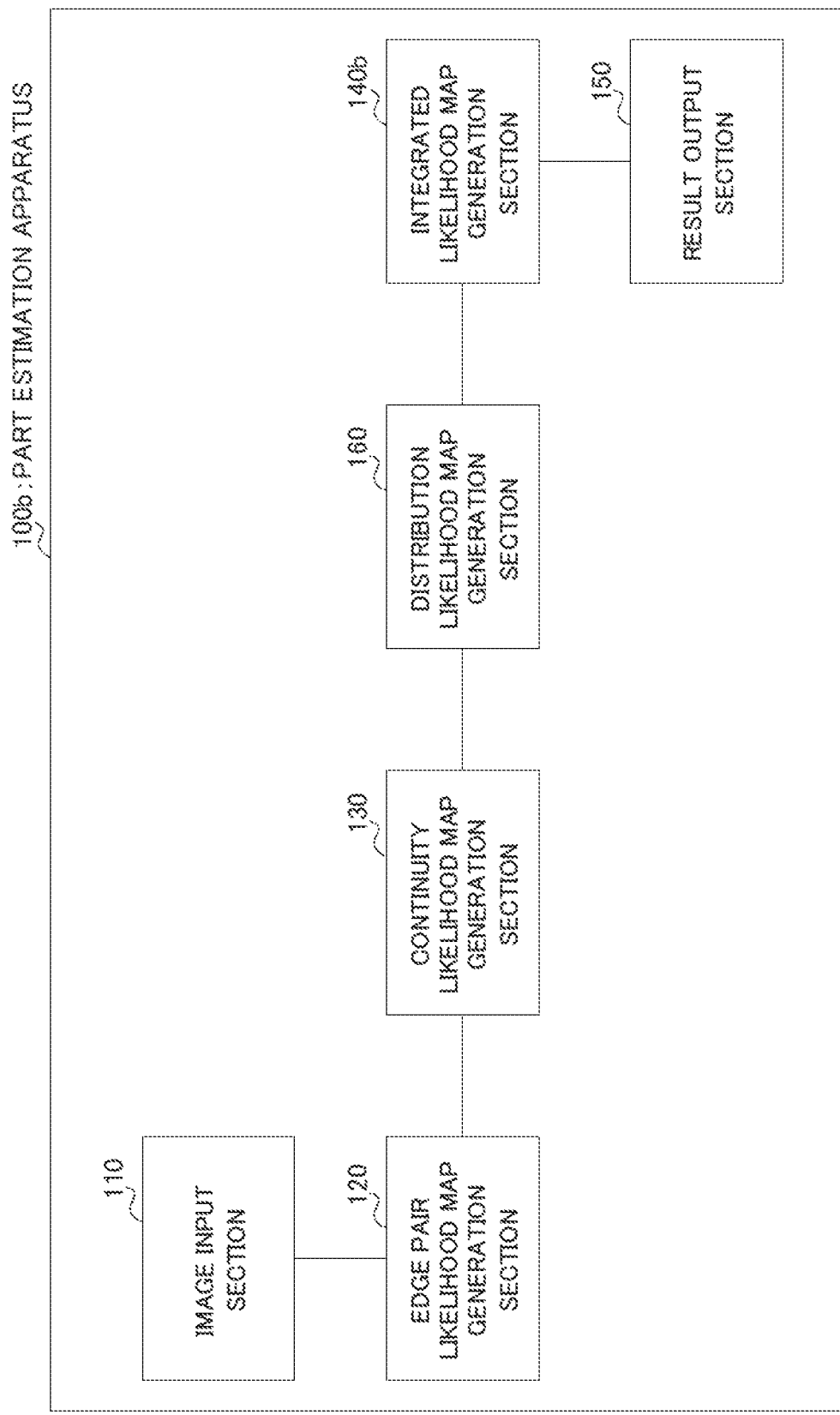
FIG. 11 is a block diagram illustrating an exemplary configuration of a part estimation apparatus in Embodiment 3 of the present invention.

FIG. 11 is a block diagram illustrating an exemplary configuration of part estimation apparatus 100b. In FIG. 11, part estimation apparatus 100b has image input section 110, edge pair likelihood map generation section 120, continuity likelihood map generation section 130, distribution likelihood map generation section 160, integrated likelihood map generation section 140b and result output section 150.

FIG. 11 is different from FIG. 4 in two points. One point is that distribution likelihood map generation section 160 is further provided, and the other point is that integrated likelihood map generation section 140b generates an integrated likelihood map using a distribution likelihood map generated by distribution likelihood map generation section 160.

Distribution likelihood map generation section 160 evaluates distribution of the continuity likelihoods included in an assumed region (for example, a part rectangle) defined in advance in each continuity likelihood map generated by continuity likelihood map generation section 130 for each gradient direction. Distribution likelihood map generation section 160 generates a distribution likelihood map by repeating evaluation of the distribution of the continuity likelihoods until covering the entire continuity likelihood map. The above-described "assumed region defined in advance" refers to, for example, a candidate region of the target part. The "candidate region of the target part" described here refers to a region where continuity likelihoods are assigned to pixels which are continuous in the same gradient direction in the continuity likelihood map.

Specifically, distribution likelihood map generation section 160 deletes continuity likelihoods whose distribution in the continuity likelihood map is determined to be different from distribution of the target part. Alternatively, distribution likelihood map generation section 160 may hold only the continuity likelihoods whose distribution is determined to be similar to the distribution of the target part. In this manner, distribution likelihood map generation section 160 generates a distribution likelihood map.

This distribution likelihood map generation process utilizes a fact that the distribution of the continuity likelihoods is different between an artifact and a part of a person. Compared to the case of gradient for an edge of the part of the person, an edge of an artifact such as an industrial product has a single gradient and thus tends to be easily extracted and have a smaller value of distribution. Therefore, in the present embodiment, it is possible to distinguish the part of the person from the artifact by evaluating the distribution.

A method for generating the distribution likelihood map will be described in detail later.

Part estimation apparatus 100b configured as described above first performs edge pair likelihood map generation process and continuity likelihood map generation process as in the above-described Embodiments 1 and 2. Subsequently, part estimation apparatus 100 performs distribution likelihood map generation process for generating for each gradient direction, a distribution likelihood map which satisfies the distribution of the target part by evaluating the distribution of the continuity likelihoods. Part estimation apparatus 100b generates an integrated likelihood map which satisfies the body constraints of the target part based on the distribution likelihood map for each gradient direction. As described above, part estimation apparatus 100b can estimate a part of person 340 with high accuracy even from an image from which it is difficult to extract an outline of the part with straight lines or from an image in which an artifact is mixed.

The configuration of part estimation apparatus 100b has been described above.

<Description Regarding Operation of Part Estimation Apparatus>

Operation of part estimation apparatus 100b will be described next.

Figure 12:
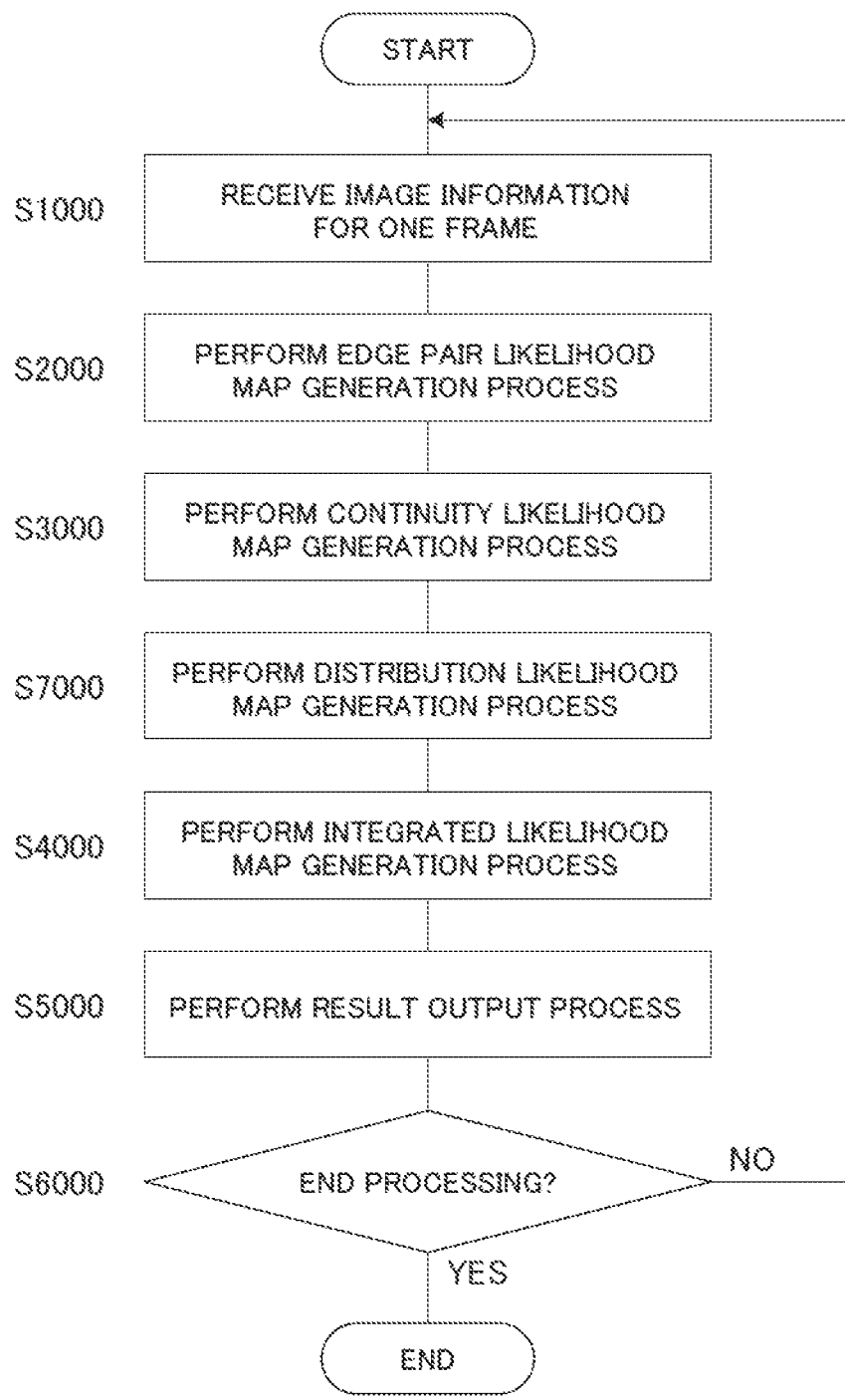
FIG. 12 is a flowchart illustrating an exemplary operation of the part estimation apparatus in Embodiment 3 of the present invention.

FIG. 12 is a flowchart illustrating exemplary operation of part estimation apparatus 100b.

FIG. 12 is different from FIG. 5 in that distribution likelihood map generation process (S7000) is added between continuity likelihood map generation process (S3000) and integrated likelihood map generation process (S4000).

In step S7000, distribution likelihood map generation section 160 performs distribution likelihood map generation process. The distribution likelihood map generation process is a process for generating the above-described distribution likelihood map.

<Description Regarding Distribution Likelihood Map Generation Process>

Here, an example of the distribution likelihood map generation process (S7000) will be described.

Distribution likelihood map generation section 160 obtains a value of distribution using the following equation:

[2] (Equation 2)

$$\sigma^2 = \frac{1}{n}\sum_{i=1}^{n}(x_i - \bar{x})^2$$

where distribution $\sigma^2$ is a distance between data and an average value obtained by obtaining deviations by subtracting average value $\bar{x}$ from data $x_i$ and dividing a sum of squares of the deviations by the number of data n. Greater distribution $\sigma^2$ indicates greater dispersion of data.

It is often a case that an edge of an artifact such as an industrial product is made up of straight lines in an image.

Therefore, in the present embodiment, by utilizing a fact that a value of the distribution of the continuity likelihood map for the artifact is smaller than that of the part of person 340, the part of person 340 can be distinguished from the artifact. Specifically, distribution likelihood map generation section 160 obtains distribution of the candidate region of the part in the continuity likelihood map for each of the same gradient directions. If the obtained value of distribution is smaller than a predetermined threshold, distribution likelihood map generation section 160 determines that the candidate region is an artifact. Distribution likelihood map generation section 160 sets a value (for example, zero) to indicate that there is no continuity likelihood for the continuity likelihoods of the pixels whose value of distribution is smaller than the predetermined threshold. Meanwhile, if the obtained value of distribution is greater than the predetermined threshold, distribution likelihood map generation section 160 determines that the candidate region is likely to be a part. Distribution likelihood map generation section 160 then holds the continuity likelihoods of the pixels whose value of distribution is greater than the predetermined threshold. For example, if the distribution of the candidate region in gradient direction k is smaller than the predetermined threshold, distribution likelihood map generation section 160 sets a value (for example, zero) to indicate that there is no likelihood for the continuity likelihoods in gradient direction k of the pixels included in the candidate region.

Here, distribution likelihood map generation section 160 may use a value learned in advance as the above-described "predetermined threshold" or may calculate a value based on an average value of the distribution for the part region obtained as a result of the previous part estimation. Alternatively, distribution likelihood map generation section 160 may classify the distribution of the extracted candidate regions into an artifact and the part of person 340 using a discrimination analysis method. The discrimination analysis method is a publicly known method in which a threshold with a maximum degree of separation is obtained to perform automatic binarization. The degree of separation can be obtained using a ratio between distribution between classes and distribution within a class when the distribution is classified into two classes of the artifact and the part of person 340.

Next, an example of a method in which distribution likelihood map generation section 160 calculates distribution of the candidate region of the part in the continuity likelihood map will be described.

First, distribution likelihood map generation section 160 calculates centroid C of the candidate region of the part in the continuity likelihood map using the following equation.

Centroid C can be calculated using the following equation when the x-coordinate and the y-coordinate of the k-th pixel $G_k$ included in the candidate region for the part are $G_k=(x_k, y_k)$, and when there are m pixels:

[3] (Equation 3)

$$C = \left( \frac{\sum_{k=1}^{m} x_k}{m}, \frac{\sum_{k=1}^{m} y_k}{m} \right)$$

Here, a straight line which passes through centroid C and which is perpendicular to a gradient direction in the continuity likelihood map including the candidate regions of the part is studied. Specifically, for example, when the gradient direction of the continuity likelihood map including the candidate regions of the part is θ, a straight line which passes through centroid C and which has an angle of θ+90 degrees is studied. Distribution likelihood map generation section 160 obtains distribution by assigning a value of the pixel in the candidate regions for the part and on this straight line to value $x_i$ in the above-described equation for obtaining distribution $\sigma^2$.

Distribution likelihood map generation section 160 compares the calculated distribution of the candidate regions of the part with a predetermined threshold set in advance. As a result of the comparison, if the value of the distribution is smaller than the predetermined threshold, distribution likelihood map generation section 160 determines that the region is less likely to be the part and sets a value (for example, zero) to indicate that there is no value of the continuity likelihood in the gradient direction. Alternatively, as a result of the comparison, if the value of the distribution is equal to or greater than the predetermined threshold, distribution likelihood map generation section 160 may determine that the region is likely to be the part and hold only the continuity likelihoods in the gradient direction.

While distribution likelihood map generation section 160 evaluates distribution of only one point of centroid C in the candidate region for the part, it is also possible to calculate a plurality of distributions and perform determination using an average value of the distributions. Accordingly, it is possible to improve robustness. For example, distribution likelihood map generation section 160 may also obtain a plurality of distributions by performing the same processing as that performed for the above-described centroid C on pixels other than centroid C, which pass through centroid C and which are on the straight line in the gradient direction in the continuity likelihood map including the candidate regions of the part.

It should be noted that continuity likelihood map generation section 130 may leave the edge pair likelihoods of the pixels in the vicinity of part rectangle 801 when generating a continuity likelihood map using part rectangle 801. The distribution, which represents dispersion of data, varies according to an amount of values distant from an expected value. Therefore, if continuity likelihood map generation section 130 leaves the edge pair likelihoods distant from the expected value, difference of the distribution between the artifact and the part of person 340 becomes large, which makes it easy to distinguish the part of person 340 from the artifact. This will be described using FIG. 13.

<Example of Continuity Likelihood Map>

Figure 13:
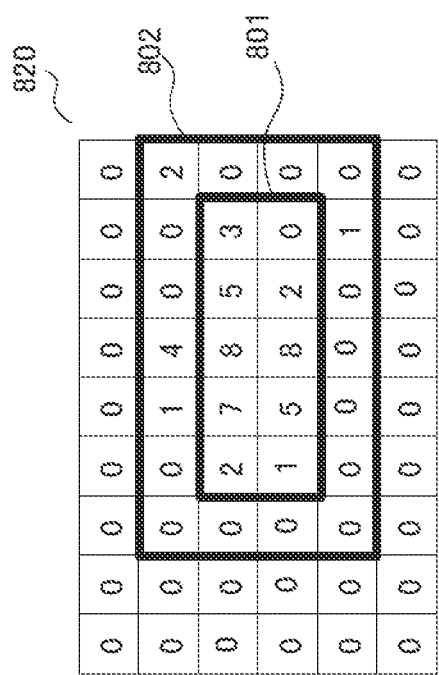
FIG. 13 illustrates an example of a continuity likelihood map in Embodiment 3 of the present invention.

FIG. 13 illustrates an example of the continuity likelihood map which is a base of the distribution likelihood map. Continuity likelihood map 820 is generated by continuity likelihood map generation section 130 holding the edge pair likelihoods of the pixels included in vicinity region 802 of part rectangle 801 as well as the edge pair likelihoods of the pixels included in part rectangle 801.

In continuity likelihood map 820 of FIG. 13, relatively high edge pair likelihoods (continuity likelihoods) exist also in pixels which are not included in part rectangle 801 but included in vicinity region 802 of part rectangle 801. Therefore, the distribution calculated from continuity likelihood map 820 of FIG. 13 is larger than the distribution calculated from continuity likelihood map 820 of FIG. 9. Accordingly, distribution likelihood map generation section 160 can distinguish the part of person 340 from the artifact with high accuracy. Because distribution likelihood map generation section 160 obtains the distribution of a region including vicinity region 802 as well as the part rectangle in this manner, it is possible to improve accuracy for distinguishing the part of person 340 from the artifact.

While vicinity region 802 obtained by adding one pixel to each side of the part rectangle is illustrated as an example in FIG. 13, the vicinity region is not limited to this. Vicinity region 802 may vary depending on a size of part rectangle 801, a type of the target part or the like.

While an example has been described here where distribution likelihood map generation section 160 evaluates the distribution within the candidate regions, it is also possible to perform evaluation also using an average value of the continuity likelihoods instead of using the distribution. This utilizes characteristics that an average value of the continuity likelihoods of the artifact tends to be high because a value of the distribution of the continuity likelihoods of the artifact is small. In this case, distribution likelihood map generation section 160 obtains an average value of the pixels having the continuity likelihoods within the candidate regions.

For example, it is assumed in FIG. 9 that continuity likelihood P of the continuity likelihood map is expressed with P(x, y, k) using x-coordinate x, y-coordinate y and gradient direction k which indicate the position of the pixel. Further, it is assumed that the position of the pixel at an upper left corner of part rectangle 801 is (i, j), and a length of a long side of the part rectangle is r, a length of a short side is s, a gradient direction is k, and the number of pixels where the continuity likelihood is zero within the part rectangle is u. At this time, average value A of the continuity likelihoods of the pixels included in part rectangle 801 can be obtained using the following equation:

[4] (Equation 4)

$$A = \frac{\sum_{y=j}^{j+s} \sum_{x=i}^{i+r} P(x, y, k)}{s \times r - u}$$

Distribution likelihood map generation section 160 compares an average value of the continuity likelihoods within the candidate regions of the part calculated using the above-described equation with a predetermined threshold set in advance. As a result of the comparison, if the average value is greater than the predetermined threshold, distribution likelihood map generation section 160 determines that the region is not likely to be the part of person 340. Distribution likelihood map generation section 160 sets a value (for example, zero) to indicate that there is no value of the continuity likelihoods for the continuity likelihoods in the gradient direction. Meanwhile, as a result of the comparison, if the average value of the continuity likelihoods is equal to or smaller than the predetermined threshold, distribution likelihood map generation section 160 determines that the region is likely to be the part of person 340, and holds the continuity likelihoods in the gradient direction.

While in the present embodiment, distribution likelihood map generation section 160 generates a distribution likelihood map using the continuity likelihood map, distribution likelihood map generation section 160 may generate a distribution likelihood map using the edge pair likelihood map in a similar manner. In this case, because there is no candidate region of the part in the edge pair likelihood map, distribution likelihood map generation section 160 calculates distribution for regions within a predetermined distance from all the pixels to perform process for determining an artifact.

Accordingly, in the present embodiment, it is possible to estimate a part while removing an edge pair likelihood for a region which is likely to be an artifact from the edge pair likelihood map.

Part estimation apparatus 100b configured as described above first performs edge pair likelihood map generation process and continuity likelihood map generation process as in the above-described Embodiments 1 and 2. Then, part estimation apparatus 100b performs distribution likelihood map generation process for generating a distribution likelihood map which satisfies conditions for distribution of the target part for each gradient direction by evaluating distribution of the continuity likelihoods based on the continuity likelihood map. Part estimation apparatus 100b generates an integrated likelihood map which satisfies body constraints of the target part based on the distribution likelihood map for each gradient direction. As described above, part estimation apparatus 100b can estimate a part of person 340 with high accuracy even from an image from which it is difficult to extract an outline of the part with straight lines or from an image in which an artifact is mixed.

(Embodiment 4)

Embodiment 4 of the present invention describes an example where when the target part is an arm (right upper arm 419, right forearm 420, left upper arm 422 and left forearm 423), information other than the target part such as a trunk or a head (hereinafter, referred to as a "non-estimation target part") is used.

A part estimation apparatus according to the present embodiment first extracts an outline of the non-estimation target part from an image. Then, the part estimation apparatus proceeds with subsequent estimation process for the target part while lowering the edge pair likelihoods or the continuity likelihoods in the vicinity regions of the outline of the extracted non-estimation target part in the continuity likelihood map or the distribution likelihood map, taking into account that there is a possibility that the edge pair likelihoods or the continuity likelihoods of the pixels in the vicinity regions of the non-estimation target part become high by the target part overlapping with the non-estimation target part on the image. Accordingly, the part estimation apparatus can estimate the part with high accuracy while eliminating the influence of the non-estimation target part.

Figure 14:
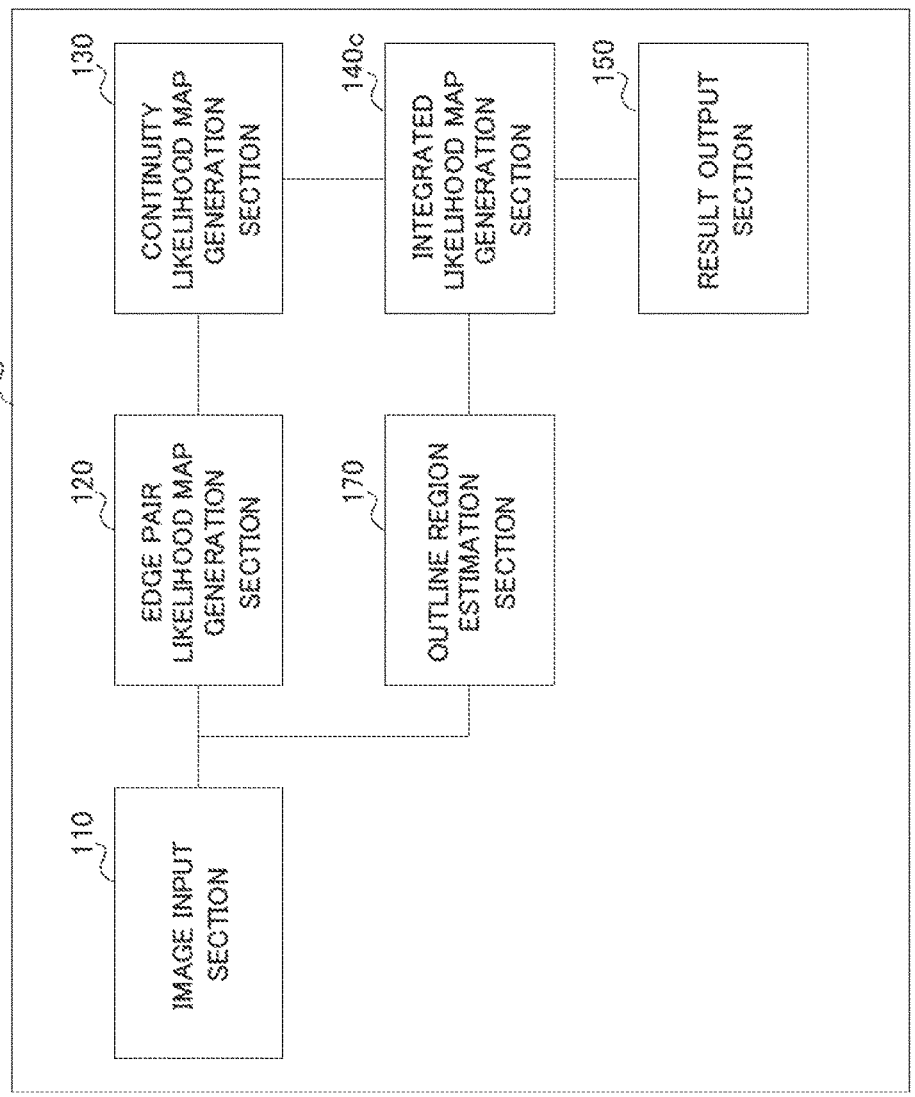
FIG. 14 is a block diagram illustrating an exemplary configuration of a part estimation apparatus in Embodiment 4 of the present invention.

FIG. 14 is a block diagram illustrating an exemplary configuration of the part estimation apparatus according to the present embodiment and corresponds to FIG. 4 of Embodiment 2. In FIG. 14, the same portions as those in FIG. 4 are denoted with the same reference numerals and descriptions thereof are omitted.

In FIG. 14, part estimation apparatus 100c has outline region estimation section 170 in addition to the configuration in FIG. 4.

It is assumed in the present embodiment that the target part is an arm (right upper arm 419, right forearm 420, left upper arm 422 and left forearm 423), and the non-estimation target part is head 418 and trunk 411.

Outline region estimation section 170 extracts an outline of the non-estimation target part of person 340 from the image and extracts regions in the vicinity as outline regions.

<Description Regarding Outline Region Estimation>

An example of outline region estimation will be described.

First, outline region estimation section 170 generates a background difference image from an input image and extracts a person candidate region of person 340. Here, the background difference image is, for example, an image indicating a difference between a background image captured in a state where there is no person 340 and the input image.

Accordingly, outline region estimation section 170 can deal with pixels which are different from the background as the person candidate region.

It should be noted that outline region estimation section 170 generates a background difference image by, for example, holding the background image in advance and calculating a difference between the background image and the input image. Alternatively, outline region estimation section 170 may generate a background difference image by extracting a region of a moving object. Further, outline region estimation section 170 may, for example, extract a region of a moving object by extracting pixels with different luminance between the previously input image and the image input this time and set the region of the moving object as the person candidate region.

In the present embodiment, first, outline region estimation section 170 extracts an upper region of the person candidate region as a head candidate region. The upper region is predefined as a region that covers a predetermined proportion (e.g., 30%) of the person candidate region from its upper edge downward, for example. Outline region estimation section 170 extracts pixels which configure the outline in the head candidate region as pixels of the outline of the head.

Further, outline region estimation section 170 may extract the head region from the extracted head candidate region using Hough transform, or the like. Hough transform is a well-known technique, capable of determining three parameters representing the center of a circle (X and Y coordinates) and its radius from edge information. Outline region estimation section 170 may extract the pixels on this circle as the pixels of the outline of the head.

Outline region estimation section 170 may add the pixels on the circle obtained using the Hough transform, or the like to the pixels of the outline of the head extracted from the head candidate region and set the obtained pixels as the outline of the head. Accordingly, outline region estimation section 170 can extract the pixels of the outline of the head more robustly even when there is a deficit in the person candidate region.

Further, outline region estimation section 170 may extract pixels common between the pixels of the outline of the head extracted from the head candidate region and the pixels on the circle extracted from the head candidate region as the outline of the head. Accordingly, outline region estimation section 170 can extract the pixels of the outline of the head more reliably.

Outline region estimation section 170 then extracts a middle region of the person candidate region as a trunk candidate region. The middle region is predefined as a region that covers a predetermined proportion (for example, 20% to 60% from the top) of the person candidate region, for example. Outline region estimation section 170 extracts pixels which configure an outline in the trunk candidate region as an outline of the trunk.

Further, outline region estimation section 170 may extract a trunk candidate region in an elliptical shape from the extracted trunk candidate region using the Hough transform, or the like in a similar manner to extraction of the pixels of the outline of the head.

Outline region estimation section 170 may add the pixels on the ellipse obtained using the Hough transform, or the like to the pixels of the outline of the trunk extracted from the trunk candidate region and extract the obtained pixels as the pixels of the outline of the trunk. Accordingly, outline region estimation section 170 can extract the pixels of the outline of the trunk more robustly even when there is a deficit in the trunk candidate region.

Further, outline region estimation section 170 may extract pixels common between the pixels extracted from the trunk candidate region and the pixels on the ellipse extracted from the trunk candidate region as the pixels of the outline of the trunk. Accordingly, outline region estimation section 170 can extract the pixels of the outline of the trunk more reliably.

Outline region estimation section 170 sets the pixels of the outlines of head 418 and trunk 411 and the regions in the vicinity extracted as described above as the outline region. Specifically, outline region estimation section 170 sets pixels within a predetermined distance around the outlines of the head and the trunk as the outline region. Here, the predetermined distance may be determined based on, for example, a size of an appearance error of the target part on the image.

Outline region estimation section 170 outputs the estimated outline region to integrated likelihood map generation section 140c.

Integrated likelihood map generation section 140c generates an integrated likelihood map using the outline region estimated by outline region estimation section 170 and the continuity likelihood map generated by the continuity likelihood map generation section.

In S9003 of FIG. 10, integrated likelihood map generation section 140c extracts a region with a large sum of the edge pair likelihoods while lowering the priority of the candidate regions having the position of the coordinate overlapping with the outline region estimated by outline region estimation section 170. The "priority" is, in other words, the priority to be extracted (selected). Specifically, integrated likelihood map generation section 140c, for example, changes the sum of the edge pair likelihoods by subtracting a predetermined value from the sum of the edge pair likelihoods for the region where the positions of the coordinate are overlapped. Accordingly, integrated likelihood map generation section 140c preferentially selects a region where the positions of the coordinates are not overlapped as the candidate region. Therefore, part estimation apparatus 100c can estimate the target part with high accuracy even when the outline of the non-estimation target part satisfies the continuity of the edge pair likelihoods which is conditions when the continuity likelihood map is generated.

Here, the above-described "predetermined value" may be, for example, a product of a proportion of the pixels where the candidate regions overlap with the outline region among the corresponding candidate regions (a value obtained by dividing the number of pixels overlapping with the outline region among the candidate region by the number of pixels of the candidate region) and the sum of the corresponding candidate regions.

Further, integrated likelihood map generation section 140c may set a lower order of priority for the candidate regions having the position of the coordinate overlapping with the outline region than the number of target parts. Specifically, for example, a case will be studied where the number of target parts is 4, 6 candidate regions are extracted, and the position of the coordinate of the third candidate region when being disposed in a descending order of the sum of the edge pair likelihoods overlaps with the outline region. In this case, integrated likelihood map generation section 140 lowers the order of the priority of the sum of the candidate regions from the third to the fifth or the subsequent positions, so that the third candidate region may not be included in a combination to be used in the process of S9004 in the first cycle in FIG. 10.

It should be noted that part estimation apparatus 100c may lower the priority in a case where an orientation of the outline region corresponds with an orientation of the candidate region as well as the position of the coordinate of the outline region estimated by outline region estimation section 170 overlaps with that of the candidate region. The orientation of the outline region is, for example, an angle in a case where outlines of right and left long sides of the trunk are approximated by straight lines, when the target part is trunk 411 of body model 410. Approximation by straight lines may be performed using a well-known method in which regression lines are obtained using a least-square method. Accordingly, part estimation apparatus 100c can estimate a part with high accuracy even when the edge pair likelihoods are high due to the outline and noise in the candidate region.

It should be noted that integrated likelihood map generation section 140c may change the order of the priority according to similarity between the candidate region and the part rectangle. The similarity between the candidate region and the part rectangle may be determined, for example, by counting the number of pixels where the candidate region does not correspond with the part rectangle when the centroid of the candidate region is overlapped with the centroid of the part rectangle, and the similarity may be determined to be lower when there are a larger number of pixels where the candidate region does not correspond with the part rectangle. The priority may be lowered accordingly. Accordingly, part estimation apparatus 100c can estimate a part with high accuracy even if the priority of the candidate region with lower similarity with the part rectangle is lowered and the edge pair likelihood is high due to noise such as a pattern of the clothes.

Figure 15:
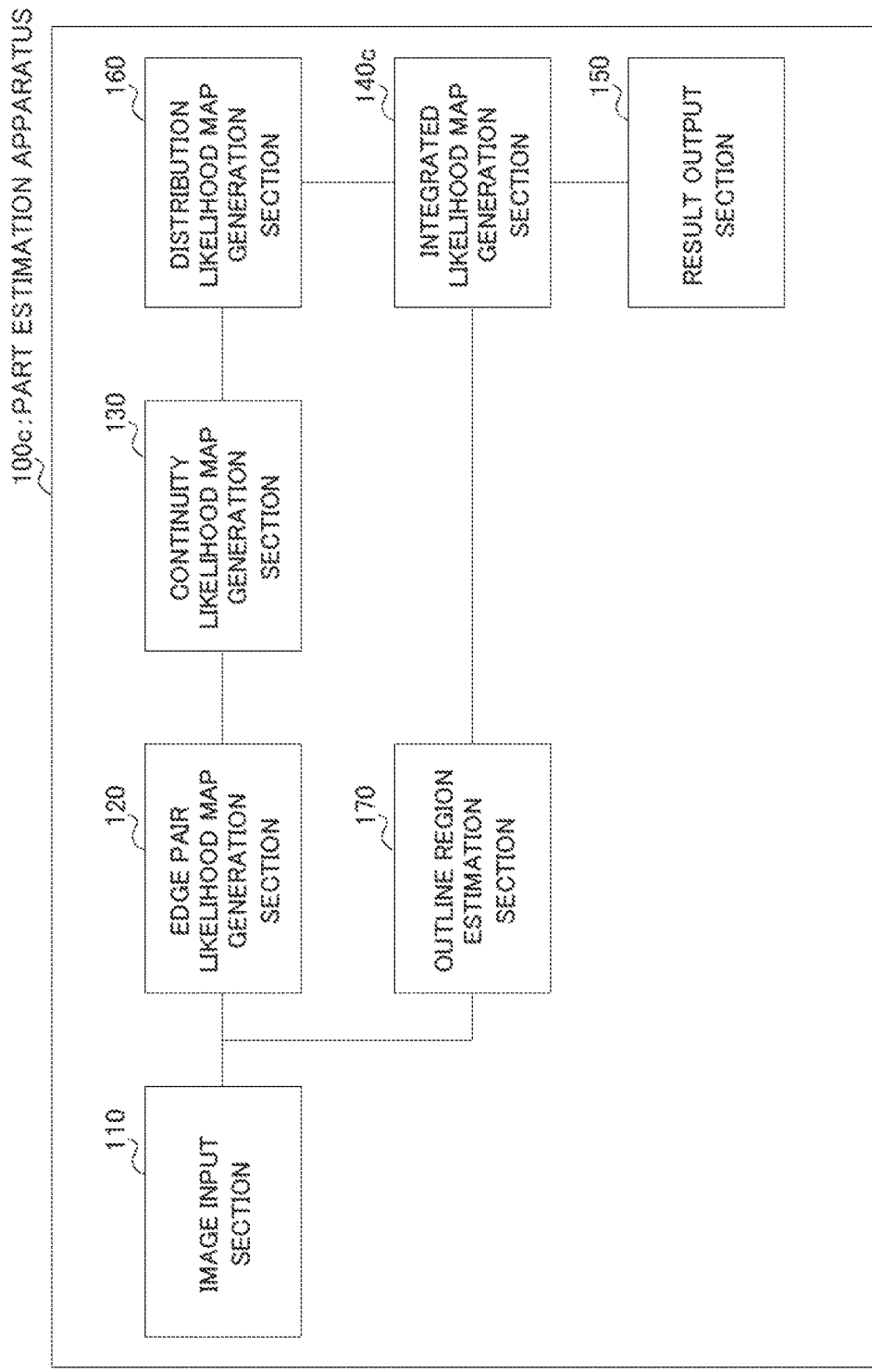
FIG. 15 is a block diagram illustrating another exemplary configuration of the part estimation apparatus in Embodiment 4 of the present invention.

It should be noted that as illustrated in FIG. 15, integrated likelihood map generation section 140c may generate an integrated likelihood map using the outline region estimated by outline region estimation section 170 and the distribution likelihood map generated by distribution likelihood map generation section 160. Accordingly, part estimation apparatus 100c can estimate a part with high accuracy even if an artifact is included in the image.

Because part estimation apparatus 100c can remove a region where the edge pair likelihood is likely to be high due to existence of the non-estimation target part from candidates for the part region, it is possible to improve the accuracy of the part estimation.

While in Embodiment 2, Embodiment 3 and Embodiment 4 of the present invention described above, the processes for estimating a target part from a background difference image have been described, the present invention is not limited to this. For example, the part estimation apparatus may use an image from which noise has been removed from the background difference image using a median filter, a well-known technique. Alternatively, part estimation apparatus 100 may use an image generated by superimposition of a background difference image and an edge image.

Embodiments 1 through 4 have been described with a case where the present invention is implemented by hardware by way of example, but the present invention can be implemented by software in concert with hardware.

A part estimation apparatus according to this disclosure includes: an edge pair likelihood map generation section that calculates an edge pair likelihood for each pixel in an image and that generates an edge pair likelihood map indicating the edge pair likelihood for each pixel, the edge pair likelihood indicating a likelihood that a pair of pixels existing in a vicinity of each pixel is edges of an estimation target part; a continuity likelihood map generation section that evaluates continuity of edge pair likelihoods of pixels included in a region assumed to represent the estimation target part for the edge pair likelihood map and that generates a continuity likelihood map indicating edge pair likelihoods having continuity as candidate regions indicating the estimation target part; and an integrated likelihood map generation section that generates an integrated likelihood map indicating the candidate regions indicated in the continuity likelihood map by narrowing down the candidate regions based on a predefined condition.

The part estimation apparatus according to this disclosure further includes: a distribution likelihood map generation section that evaluates distribution of the edge pair likelihoods having the continuity indicated in the continuity likelihood map and that generates a distribution likelihood map satisfying distribution for the estimation target part, in which the integrated likelihood map generation section generates the integrated likelihood map based on the distribution likelihood map.

In the part estimation apparatus to this disclosure: the continuity likelihood map generation section generates the continuity likelihood map taking into account edge pair likelihoods of pixels included in a vicinity region of the region assumed to represent the estimation target part, in addition to the edge pair likelihoods having continuity; and the distribution likelihood map generation section generates the distribution likelihood map based on the continuity likelihood map.

The part estimation apparatus according to this disclosure further includes: an outline region estimation section that estimates an outline region of a non-estimation target part that is a part other than the estimation target part, in which the integrated likelihood map generation section preferentially selects a candidate region having a coordinate not overlapping with a coordinate of the outline region estimated by the outline region estimation section, when narrowing down the candidate regions.

In the part estimation apparatus according to this disclosure, the edge pair likelihood map generation section dynamically adjusts a value to be used for generating the edge pair likelihood map, according to a size of the image.

A part estimation method according to the present disclosure includes: calculating an edge pair likelihood for each pixel in an image and generating an edge pair likelihood map indicating the edge pair likelihood for each pixel, the edge pair likelihood indicating a likelihood that a pair of pixels existing in a vicinity of each pixel is edges of an estimation target part; evaluating continuity of edge pair likelihoods of pixels included in a region assumed to represent the estimation target part for the edge pair likelihood map and generating a continuity likelihood map indicating edge pair likelihoods having continuity as candidate regions indicating the estimation target part; and generating an integrated likelihood map indicating the candidate regions indicated in the continuity likelihood map by narrowing down the candidate regions based on a predefined condition.

A part estimation program according to the present disclosure is a program causing a computer of an apparatus that inputs or generates an image to execute processing including: calculating an edge pair likelihood for each pixel in an image and generating an edge pair likelihood map indicating the edge pair likelihood for each pixel, the edge pair likelihood indicating a likelihood that a pair of pixels existing in a vicinity of each pixel is edges of an estimation target part; evaluating continuity of edge pair likelihoods of pixels included in a region assumed to represent the estimation target part for the edge pair likelihood map and generating a continuity likelihood map indicating edge pair likelihoods having continuity as candidate regions indicating the estimation target part; and generating an integrated likelihood map indicating the candidate regions indicated in the continuity likelihood map by narrowing down the candidate regions based on a predefined condition.

The disclosure of the specification, drawings, and abstract in Japanese Patent Application No. 2012-076072 filed on Mar. 29, 2012 is incorporated herein by reference in its entirety.

INDUSTRIAL APPLICABILITY

The present invention is useful as a part estimation apparatus, a part estimation method and a part estimation program for estimating a part of an articulated object such as a person, an animal and a robot.

REFERENCE SIGNS LIST 100, 100b, 100c Part estimation apparatus
110 Image input section
120 Edge pair likelihood map generation section
130 Continuity likelihood map generation section
140, 140b, 140c Integrated likelihood map generation section
150 Result output section
160 Distribution likelihood map generation section
170 Outline region estimation section
200 Part estimation system
310 Monitored area
320 Monitoring camera
330 Floor
340 Person

The invention claimed is:

1. A part estimation apparatus comprising:
one or more processors configured to:
set, for each pixel in an image, a pixel of interest and a pair of pixels located at an equal distance from the pixel of interest on a straight line including the pixel of interest and perpendicular to a predetermined gradient direction, calculates an edge pair likelihood and generates an edge pair likelihood map indicating the edge pair likelihood for each pixel, the distance being determined based on the thickness of an estimation target part, the edge pair likelihood indicating a likelihood that each of the pair of pixels is an edge of the estimation target part;
generate a continuity likelihood map indicating candidate regions respectively indicating the estimation target part based on the edge pair likelihoods of pixels included in a region assumed to represent the estimation target part extending in the gradient direction; and
generate an integrated likelihood map indicating the candidate regions indicated in the continuity likelihood map by narrowing down the candidate regions based on a predefined condition.

2. The part estimation apparatus according to claim 1, wherein the one or more processors are further configured to:
evaluate distribution of the edge pair likelihoods having continuity indicated in the continuity likelihood map and generate a distribution likelihood map satisfying distribution for the estimation target part, wherein
the integrated likelihood map is generated based on the distribution likelihood map.

3. The part estimation apparatus according to claim 2, wherein:
the continuity likelihood map is generated by taking into account edge pair likelihoods of pixels included in a vicinity region of the region assumed to represent the estimation target part, in addition to the edge pair likelihoods having continuity; and
the distribution likelihood map is generated based on the continuity likelihood map.

4. The part estimation apparatus according to claim 1, wherein the one or more processors are further configured to:
estimate an outline region of a non-estimation target part that is a part other than the estimation target part, and
select a candidate region having a coordinate not overlapping with an estimated coordinate of the outline region, when narrowing down the candidate regions.

5. The part estimation apparatus according to claim 1, wherein the one or more processors are further configured to dynamically adjust a value to be used for generating the edge pair likelihood map, according to a size of the image.

6. A part estimation method comprising:
setting, for each pixel in an image, a pixel of interest and a pair of pixels located at an equal distance from the pixel of interest on a straight line including the pixel of interest and perpendicular to a predetermined gradient direction, calculating an edge pair likelihood and generating an edge pair likelihood map indicating the edge pair likelihood for each pixel, the distance being determined based on the thickness of an estimation target part, the edge pair likelihood indicating a likelihood that each of the pair of pixels is an edge of the estimation target part;
generating a continuity likelihood map indicating candidate regions respectively indicating the estimation target part based on the edge pair likelihoods of pixels included in a region assumed to represent the estimation target part extending in the gradient direction; and
generating an integrated likelihood map indicating the candidate regions indicated in the continuity likelihood map by narrowing down the candidate regions based on a predefined condition.

7. A non-transitory computer readable storage medium storing a part estimation program that causes a computer of an apparatus that inputs or generates an image to execute a method comprising:
setting, for each pixel in an image, a pixel of interest and a pair of pixels located at an equal distance from the pixel of interest on a straight line including the pixel of interest and perpendicular to a predetermined gradient direction, calculating an edge pair likelihood and generating an edge pair likelihood map indicating the edge pair likelihood for each pixel, the distance being determined based on the thickness of an estimation target part, the edge pair likelihood indicating a likelihood that each of the pair of pixels is an edge of the estimation target part;
generating a continuity likelihood map indicating candidate regions respectively indicating the estimation target part based on the edge pair likelihoods of pixels included in a region assumed to represent the estimation target part extending in the gradient direction; and generating an integrated likelihood map indicating the candidate regions indicated in the continuity likelihood map by narrowing down the candidate regions based on a predefined condition.

8. The part estimation apparatus according to claim 1, wherein the continuity likelihood map generation section calculates a product of a sum of luminance of the pixels within a first small region including one of the pair of pixels and a sum of luminance of the pixels within a second small region including another of the pair of the pair of pixels as the edge pair likelihood and determine the candidate regions based on the sum of the edge pair likelihoods of the region assumed to represent the estimation target part.

* * * * *

UNITED STATES PATENT AND TRADEMARK OFFICE
CERTIFICATE OF CORRECTION

PATENT NO. : 9,639,950 B2
APPLICATION NO. : 14/388254
DATED : May 2, 2017
INVENTOR(S) : Kyoko Kawaguchi et al.

It is certified that error appears in the above-identified patent and that said Letters Patent is hereby corrected as shown below:

In the Claims

Column 29, Lines 6-7, please replace "wherein the continuity likihood map generation section calculates a" with -- wherein the one or more processors are further configured to calculate a --

Signed and Sealed this
Third Day of October, 2017

Joseph Matal
*Performing the Functions and Duties of the
Under Secretary of Commerce for Intellectual Property and
Director of the United States Patent and Trademark Office*